US012606089B2

(12) United States Patent
Tagalpallewar et al.

(10) Patent No.: US 12,606,089 B2
(45) Date of Patent: Apr. 21, 2026

(54) METHOD AND APPARATUS FOR LOADER POSITIONING AND LOAD HANDLING USING VISION SYSTEM

(71) Applicant: Deere & Company, Moline, IL (US)

(72) Inventors: Nikhil D. Tagalpallewar, Kinwat (IN); Gopal M. Goenka, Pune (IN); Bharat J. Joshi, Pune (IN); Vishwanath V. Patil, Pune (IN); Jose I. Vazquez, Monterrey (MX); Daniel Chapa Montemayor, Monterrey (MX); Gerardo Gonzalez Castañeda, Monterrey (MX); Jesus A. Montalvo Urbina, Guadalupe (MX)

(73) Assignee: Deere & Company, Moline, IL (US)

( * ) Notice: Subject to any disclaimer, the term of this patent is extended or adjusted under 35 U.S.C. 154(b) by 248 days.

(21) Appl. No.: 18/356,558

(22) Filed: Jul. 21, 2023

(65) Prior Publication Data

US 2025/0026271 A1 Jan. 23, 2025

(51) Int. Cl.
 B60R 1/24 (2022.01)
 A01D 87/12 (2006.01)
 (Continued)

(52) U.S. Cl.
 CPC ................ B60R 1/24 (2022.01); B66F 9/065 (2013.01); B66F 9/0755 (2013.01); G06T 7/73 (2017.01);
 (Continued)

(58) Field of Classification Search
 CPC ................ B60R 1/24; B60R 2300/207; B60R 2300/302; G06T 7/73; G06T 2207/20081;
 (Continued)

(56) References Cited

U.S. PATENT DOCUMENTS

| 6,263,039 B1 | 7/2001 | Ducharme |
| 6,765,607 B2 | 7/2004 | Mizusawa et al. |
| | (Continued) | |

FOREIGN PATENT DOCUMENTS

| CA | 2097204 A1 | 12/1993 | |
| CN | 114406985 A | * 4/2022 | .............. B25J 19/04 |
| | (Continued) | | |

OTHER PUBLICATIONS

CN114406985A machine translation (Year: 2022).*

(Continued)

*Primary Examiner* — Navid Z. Mehdizadeh
*Assistant Examiner* — Oliver Tan
(74) *Attorney, Agent, or Firm* — Tucker Ellis LLP

(57) ABSTRACT

A positioning assist apparatus includes a vision system that generates target device data representative of an obtained image of a set of target devices carried on the boom or tool carrier of the loader or on both, and positioning assist logic executable by a processor to determine a current position and/or pose of the loader based on the target device data, and to generate current loader position data representative of the determined current position of the loader. The loader positon is based on loader height as may be represented by boom angle, and tool carrier angle. Data is generated for display to an operator to visually communicate movement instructions to the operator and/or to generate control signals controlling the loader, each to move the loader from the determined current position to a desired position in response to a return to position (RTP) command received by the apparatus.

20 Claims, 13 Drawing Sheets

(51) Int. Cl.
| | |
|---|---|
| *B66F 9/065* | (2006.01) |
| *B66F 9/075* | (2006.01) |
| *E02F 3/43* | (2006.01) |
| *G06T 7/73* | (2017.01) |

(52) U.S. Cl.
CPC ...... *A01D 87/122* (2013.01); *B60R 2300/207* (2013.01); *B60R 2300/302* (2013.01); *E02F 3/431* (2013.01); *G06T 2207/20081* (2013.01)

(58) Field of Classification Search
CPC ...... B66F 9/065; B66F 9/0755; A01D 87/122; E02F 3/431
See application file for complete search history.

(56) References Cited

U.S. PATENT DOCUMENTS

| | | | |
|---|---|---|---|
| 6,970,184 | B2 | 11/2005 | Hirama et al. |
| 7,752,778 | B2 | 7/2010 | Schoenmaker et al. |
| 7,797,860 | B2 | 9/2010 | Schoenmaker et al. |
| 8,600,627 | B2 | 12/2013 | Beck et al. |
| 9,139,977 | B2 | 9/2015 | Mccain et al. |
| 10,106,072 | B2 | 10/2018 | Liñan et al. |
| 10,106,951 | B2 | 10/2018 | Myers |
| 10,132,060 | B2 | 11/2018 | Forcash et al. |
| 10,351,061 | B1 | 7/2019 | Chaudhari |
| 10,586,349 | B2 | 3/2020 | Li et al. |
| 11,338,940 | B2 | 5/2022 | Wang |
| 11,401,684 | B2 | 8/2022 | Berry et al. |
| 2001/0009206 | A1 | 7/2001 | Lines |
| 2002/0059075 | A1 | 5/2002 | Schick et al. |
| 2002/0125018 | A1 | 9/2002 | Bernhardt et al. |
| 2004/0054457 | A1 | 3/2004 | Kormann |
| 2005/0085973 | A1 | 4/2005 | Furem et al. |
| 2014/0146167 | A1 | 5/2014 | Friend et al. |
| 2014/0151979 | A1 | 6/2014 | Puckett et al. |
| 2015/0379785 | A1 | 12/2015 | Brown et al. |
| 2016/0312432 | A1 | 10/2016 | Wang et al. |
| 2017/0002547 | A1 | 1/2017 | Omote |
| 2018/0080193 | A1* | 3/2018 | Myers ..................... E02F 9/262 |
| 2018/0245316 | A1 | 8/2018 | Forcash et al. |
| 2019/0009817 | A1 | 1/2019 | Bradley et al. |
| 2020/0205911 | A1* | 7/2020 | Hufford ................. A61B 34/20 |
| 2020/0279397 | A1* | 9/2020 | Cheng ..................... G06T 7/74 |
| 2020/0363815 | A1 | 11/2020 | Mousavian |
| 2021/0043085 | A1 | 2/2021 | Kreiling et al. |
| 2021/0127550 | A1 | 5/2021 | Ohrstrom et al. |
| 2021/0301494 | A1 | 9/2021 | Berry et al. |
| 2022/0112696 | A1 | 4/2022 | Sud et al. |
| 2022/0322240 | A1 | 10/2022 | Fukuta et al. |
| 2022/0332248 | A1 | 10/2022 | Vazquez et al. |
| 2022/0332249 | A1 | 10/2022 | Vazquez et al. |
| 2023/0340757 | A1 | 10/2023 | Tagalpallewar et al. |

FOREIGN PATENT DOCUMENTS

| | | |
|---|---|---|
| EP | 4086392 A1 | 11/2022 |
| EP | 4265849 A1 | 10/2023 |
| FR | 3033053 A1 | 8/2016 |
| WO | 2017207522 A1 | 12/2017 |

OTHER PUBLICATIONS

Extended European Search Report and Written Opinion issued in European Patent Application No. 24186696.1 dated Dec. 23, 2024, in 08 pages.

Extended European Search Report and Written Opinion issued in European Patent Application No. 24185862.0 dated Dec. 13, 2024, in 07 pages.

Extended European Search Report and Written Opinion issued in European Patent Application No. 24185861.2 dated Dec. 6, 2024, in 05 pages.

Non-Final Office Action dated Aug. 23, 2024 for U.S. Appl. No. 17/725,032 (18 pages).

Notice of Allowance dated May 7, 2025 for U.S. Appl. No. 18/356,560 (15 pages).

Final Office Action mailed Feb. 15, 2024 for U.S. Appl. No. 17/230,093 (6 pages).

Non-Final Office Action mailed Oct. 30, 2023 for U.S. Appl. No. 17/230,093 (13 pages).

Final Office Action mailed Feb. 15, 2024 for U.S. Appl. No. 17/724,598 (6 pages).

Non-Final Office Action dated Oct. 27, 2023 for U.S. Appl. No. 17/724,598 (13 pages).

Non-Final Office Action dated Apr. 19, 2024 for U.S. Appl. No. 17/725,032 (16 pages).

Extended European Search Report dated Aug. 23, 2023 for Application Serial No. 23166423.6 (6 pages).

Notice of Allowance dated Aug. 13, 2025 for U.S. Appl. No. 18/356,560 (15 pages).

Office Action dated Mar. 10, 2026 for U.S. Appl. No. 18/356,552 (11 pages).

* cited by examiner

METHOD AND APPARATUS FOR LOADER POSITIONING AND LOAD HANDLING USING VISION SYSTEM

FIELD OF THE DISCLOSURE

The embodiments herein are directed to methods and systems that assist an operator perform activities with a loader of a work vehicle.

BACKGROUND

Many machines offer load manipulation that is outside of the strength and reach capabilities of the human body due for example to load size and the natural capacities or incapacities of human workers. Such machines may use hydraulic boom mechanisms for example that selectively couple with an attachment such as an implement, a tool or the like on the end of the boom that is then in turn used to engage or otherwise manipulate heavy, large, or otherwise awkward loads. When operating such machines, the enhanced reach capability can sometimes undermine visibility as spatial perception is difficult to realize from a single point of view which can be composed from two visuals, as when using two human eyes due to relative size and position of distant objects. When spatial perception is not easily attained, many operations may be performed by trial and error thereby undermining time efficiency, and doubling unnecessary component usage if the intended operation such as engaging an implement or workpiece is completed following a second attempt or worse than doubling the unnecessary component usage if the intended operation is ultimately completed after third, fourth, etc. attempts. All of this elevates the stress level of the operator and adversely affects productivity.

For some repetitive operations it is important to position the loader and in particular the boom and/or any implement carried on the end of the boom quickly and efficiently at different required one or more heights during the repetitive operation. Accurately knowing the position of the loader at different stages of operation is important for enhancing the productivity as well as for improving operator comfort.

In addition, some machines may use such boom mechanisms with a tool carrier that adapts the boom for mutual coupling with a wide variety of tools, implements, or the like. In work vehicles such as tractors outfitted with such loaders, the tool carrier on the free end of the loader is typically provided with one or more attachment features such as one or more pins or the like and, correspondingly, the implement is similarly provided with one or more attachment features such as one or more hooks or the like. The pins and hooks may be selectively mutually coupled for attaching the implement onto the tool carrier on the end of the loader, and they may be similarly selectively mutually decoupled for disconnecting the implement from the tool carrier of the loader so that another different tool may be attached to the loader.

Some operators may often spend a significant amount of time manually verifying the proper alignment between the tool carrier portion of the loader with the implement prior to attaching the implement onto the tool carriers, wherein that time spent could otherwise be directed to performing the underlying work task at hand. This leads to inefficient equipment utilization and reduced operator productivity. This problem is exacerbated in particular when the boom significantly or wholly blocks the tool carrier from the view of the operator. Valuable operational time is therefore wasted by the operator performing these "pre-hooking" alignment operations. Similar inefficiencies may also arise during the operation of approaching and engaging workpieces with the implements. Therefore accurately knowing the position of the tool carrier on the end of the boom at different stages of operation in attaching with an implement is important for enhancing the productivity as well as for improving operator comfort.

SUMMARY

Embodiments herein are directed to systems and methods that assist an operator perform activities with a loader of a work vehicle.

In particular, the embodiments herein are directed to methods and systems that provide assistance to an operator of a vehicle with movement of a loader carried on an associated tractor for connection of a tool carrier on the end of a boom of a the loader with an implement, and also for assisting in providing tool carrier height and level detection for performing work functions such as attaching the tool carrier with implements, and further also for assisting in providing implement height and level detection for performing work functions with the attached implements, all for efficient and safe vehicle operation, material handling, and load manipulation. It is to be understood that material handling and manipulation includes changing material position such as picking up or laying down loads such as bales, pallets or the like, and boom attachment coupling such as when attaching an implement such as a bucket, a pallet fork or the like to a carrier or receiver on the end of the boom of a loader. "Material handling" as used herein includes and is not limited to any and all operations were material or loads of any type are manipulated, moved, transported, and the like. Although the example embodiments will be described as systems and methods providing viewable images for assisting mutual coupling of loaders and implements, and further providing implement height and level detection for performing work functions with the implements, all for efficient and safe vehicle and loader operation, and easy implement attachment, it is to be appreciated that the embodiments are not limited to those particular uses or applications, and may as well be used anywhere there is a desire to provide an operator of any type vehicle having equipment that may be selectively couplable with associated implements and/or tools for performing wide ranges of work functions or other uses of any type.

An embodiment herein is directed to systems and methods that provide a loader height indication to an operator.

An embodiment herein is directed to systems and methods that provide a loader height indication to an operator in a form that includes an indication of a height of the boom of the loader together with an indication of an angle of the tool carrier of the loader. In any of the embodiments herein the angle of the tool carrier of the loader may comprise the angle of the tool carrier relative to the ground beneath the tractor carrying the loader or, equivalently, the angle of the tool carrier relative to a plane that remains level for all positions and orientations of the tractor carrying the loader.

An embodiment herein is directed to systems and methods that provide a loader height indication to an operator, wherein the loader height indication essentially reflects an indication of a pose of a tool carrier. The indication of the pose of the tool carrier takes into consideration and includes a height of the loader boom and an angle of inclination of the loader tool carrier relative to the boom.

An embodiment herein is directed to systems and methods that provide a loader height indication to an operator for operator assistive loader positioning. In one form, the determination of the loader height includes a determination of a height of the boom of the loader together or in combination with a determination of an angle of the tool carrier of the loader for the operator assistive loader positioning. In one form, the indication of the determined loader height includes an indication of a height of the boom of the loader together with an indication of an angle of the tool carrier of the loader for the operator assistive loader positioning.

An embodiment herein is directed to systems and methods that provide a loader height indication to an operator for automated loader positioning. In one form, the indication of the loader height includes an indication of a height of the boom of the loader together with an indication of an angle of the tool carrier of the loader for the automated loader positioning.

An embodiment herein is directed to systems and methods that provide a loader height indication to an operator for operator assistive load handling. In one form, the indication of the loader height includes an indication of a height of the boom of the loader together with an indication of an angle of an implement on the tool carrier of the loader for the operator assistive load handling. In any of the embodiments herein the angle of the implement on the tool carrier may include or otherwise represent the angle of a surface of interest and/or of a geometric feature of the implement such as for example the angle of the upper surface and/or of an upper edge of a tine of a pallet fork implement, the angle of the lower cutting edge and/or the lower flat surface of a bucket implement, the angle of a central axis of an elongate prong of a bale spear implement, or the like. In any of the embodiments herein the angle of the implement or surface and/or geometric feature of the implement may comprise the angle of the implement or surface and/or geometric feature of the implement relative to the ground beneath the tractor carrying the loader or, equivalently, the angle of the implement or surface and/or geometric feature of the implement relative to a plane that remains level for all positions and orientations of the tractor carrying the loader.

An embodiment herein is directed to systems and methods that provide a loader height indication to an operator for automated load handling. In one form, the indication of the loader height includes an indication of a height of the boom of the loader together with an indication of an angle of an implement on the tool carrier of the loader for the automated load handling.

An embodiment herein is directed to systems and methods that provide a loader height indication to an operator for assisting the operator perform work functions with the implements.

An embodiment herein is directed to systems and methods that provide a loader height indication to an operator for performing automated work functions with the implements.

An embodiment herein is directed to systems and methods that use a vision system such as an imaging system to provide a loader position indication for visually communicating a determined current loader height to the operator for assisting moving the loader to the desired loader height.

An embodiment herein is directed to systems and methods that use a vision system such as an imaging system to provide a loader height and/or level indication for assisting moving the loader to the desired loader height and/or level.

An embodiment herein is directed to systems and methods that use a vision system such as an imaging system to provide a loader height and/or level indication for automated loader positioning to automatically move the loader from determined current loader heights to desired loader heights in sequence, wherein the sequence performs a desired operation with the loader.

An embodiment herein is directed to systems and methods that use a vision system such as an imaging system to provide a loader height and/or level indication for automated load handling to automatically move the loader from determined current loader heights to desired loader heights in sequence, wherein the sequence performs a desired operation on or with the load with the loader.

An embodiment herein is directed to systems and methods that use a vision system such as an imaging system to provide implement height and level detection for performing work functions with the implements.

An embodiment herein is directed to systems and methods that use a vision system such as an imaging system to provide operator training of systems that provide loader height and/or level indication for automated loader positioning and automated load handling.

In accordance with an aspect herein, a positioning assist apparatus is provided for assisting moving a loader carried on an associated tractor to one or more desired positions. The apparatus includes a vision system such as an imaging system, a loader position control apparatus operatively coupled with the vision system, and a display unit operatively coupled with the loader position control apparatus. The vision system is operable to image a set of one or more target devices carried on the loader to generate target device data representative of the image of the set of one or more target devices. The loader position control apparatus includes a processor device, a non-transient memory device operatively coupled with the processor device and storing the target device data, and positioning assist logic stored in the memory device. The display unit includes a screen that is viewable by an operator of the associated tractor. The processor device is operable to execute the positioning assist logic to determine, based on the target device data, a current height of the loader, and to generate, based on the determined current height of the loader, current loader height data representative of the determined current height of the loader. The wherein the display unit is operable to display on the screen, based on the generated current loader height data, a loader current height image viewable by the operator of the associated tractor for assisting the operator move the loader to the desired position.

In any of the embodiments herein, the processor device is operable to execute the positioning assist logic to determine, based on the target device data, a current height of the loader that includes a current height of the boom and a current angle of the tool carrier, and to generate, based on the determined current height of the loader, current loader height data representative of the determined current height of the loader. The wherein the display unit is operable to display on the screen, based on the generated current loader height data, a loader current height image that includes current boom height and current carrier angle images that are viewable by the operator of the associated tractor for assisting the operator move the loader to the desired position.

In any of the embodiments herein, the memory device of the positioning assist apparatus stores desired loader position data representative of the desired position of the loader, and the processor device is operable to execute automated operation logic to generate a control signal controlling one or more cylinders of the loader based on the current loader height data and the desired loader position data to move the loader from the determined current height to the desired position in response to a return to position (RTP) command received by the positioning assist apparatus. In any of the embodiments herein, the processor device is operable to execute automated operation logic to generate a control signal controlling lift cylinders to extend (raising the boom assembly) and to retract (lowering the boom assembly) and controlling bucket cylinders to retract (pitching the tool carrier upwardly relative to the ground/boom), and to extend (pitching the tool carrier downwardly relative to the ground/boom) based on the current loader height data and the desired loader position data to move the boom and/or the tool carrier loader from the determined current height to the desired position in response to a return to position (RTP) command received by the positioning assist apparatus.

In any of the embodiments herein, the positioning assist apparatus further includes loader operator assist task data stored in the memory device, wherein the operator assist loader task data is representative of a desired operation to be performed by the loader and comprises a first set of loader orientation command data representative of an ordered sequence of positions to assume by the loader to perform the desired automated operation, wherein the processor device is operable to execute the operator assist operation logic to, in turn for each loader orientation command data of the first set of loader orientation command data determine based on the vision system imaging the target device data a further current height of the loader, generate based on the determined further current height of the loader further current loader height data representative of the determined further current height of the loader, and generate the control signal for displaying an image of the current height and the further current height of the loader to the operator based on a selected loader orientation command data of the loader task data and the generated further current loader height data whereby the operator may move the loader from the determined further current height to a desired height position of the ordered sequence of positions in response to the signals from the positioning assist apparatus for performing the desired automated operation.

In any of the embodiments herein, processor device is operable to execute the operator assist operation logic to, in turn for each loader orientation command data of the first set of loader orientation command data determine based on the vision system imaging the target device data a further current height of the loader including a boom height and/or carrier angle, generate based on the determined further current height of the loader further current loader height data including boom height and/or carrier angle data representative of the determined further current height of the loader including the boom height and/or carrier angle, and generate the control signal for displaying images of the current boom height and/or carrier angle and the further current boom height and/or carrier angle to the operator based on a selected loader orientation command data of the loader task data and the generated further current loader height data whereby the operator may move the boom and/or tool carrier loader from the determined further current height to a desired height position of the ordered sequence of positions in response to the signals from the positioning assist apparatus for performing the desired automated operation.

In any of the embodiments herein, the positioning assist apparatus further includes loader task data stored in the memory device, wherein the loader task data is representative of a desired automated operation to be performed by the loader and comprises a first set of loader orientation command data representative of an ordered sequence of positions to assume by the loader to perform the desired automated operation, wherein the processor device is operable to execute the automated operation logic to, in turn for each loader orientation command data of the first set of loader orientation command data determine based on the vision system imaging the target device data a further current height of the loader, generate based on the determined further current height of the loader further current loader height data representative of the determined further current height of the loader, and generate the control signal controlling the one or more cylinders of the loader based on a selected loader orientation command data of the loader task data and the generated further current loader height data to move the loader from the determined further current height to a desired height position of the ordered sequence of positions in response to the return to position (RTP) command received by the positioning assist apparatus for performing the desired automated operation.

In any of the embodiments herein, the processor device is operable to execute the automated operation logic to, in turn for each loader orientation command data of the first set of loader orientation command data determine based on the vision system imaging the target device data a further current boom height and/or carrier angle, generate based on the determined further current boom height and/or carrier angle further current boom height and/or carrier angle data representative of the determined further current boom height and/or carrier angle, and generate control signals controlling the lift cylinders to extend (raising the boom assembly) and to retract (lowering the boom assembly) and controlling the bucket cylinders to retract (pitching the tool carrier upwardly relative to the ground/boom), and to extend (pitching the tool carrier downwardly relative to the ground/boom) based on a selected loader orientation command data of the loader task data and the generated further current loader height data to move the boom and/or carrier from the determined further current boom height and/or carrier angle to a desired boom height and/or carrier angle position of the ordered sequence of positions in response to the return to position (RTP) command received by the positioning assist apparatus for performing the desired automated operation.

In any of the embodiments herein, the processor device of the positioning assist apparatus is operable to execute training logic to generate the loader task data during a training session of the positioning assist apparatus by, with the loader disposed in a first desired position of the ordered sequence of positions to assume by the loader to perform the desired automated operation imaging by the vision system the set of one or more target devices carried on the loader to generate first target device training data representative of the image of the set of one or more target device images obtained with the loader disposed in the first desired position, storing the first target device training data in the memory device as the loader task data and, with the loader disposed in a second desired height position of the ordered sequence of positions to assume by the loader to perform the desired automated operation, imaging by the vision system the set of one or more target devices carried on the loader to generate second target device training data representative of the image of the set of one or more target device images obtained with the loader disposed in the second desired position, and storing the second target device training data in the memory device as the loader task data.

In any of the embodiments herein, the processor device of the positioning assist apparatus is operable to execute training logic to generate the loader task data during a training session of the positioning assist apparatus by, with the boom and/or carrier disposed in a first desired position of the ordered sequence of positions to assume by the loader to perform the desired automated operation imaging by the vision system the set of one or more target devices carried on the loader and/or carrier to generate first target device training data representative of the image of the set of one or more target device images obtained with the boom and/or carrier disposed in the first desired position, storing the first target device training data in the memory device as the loader task data and, with the boom and/or carrier disposed in a second desired position of the ordered sequence of positions to assume by the loader to perform the desired automated operation, imaging by the vision system the set of one or more target devices carried on the boom and/or carrier to generate second target device training data representative of the image of the set of one or more target device images obtained with the boom and/or carrier disposed in the second desired position, and storing the second target device training data in the memory device as the loader task data.

In any of the embodiments herein, the positioning assist apparatus further includes an input device operatively coupled with the loader position control apparatus, wherein the input device is operable to receive a training confirmation signal, wherein the processor device is operable to execute the training logic to store the first and second target device training data in the memory device as the loader task data based on the input device receiving the training confirmation signal from the operator of the associated tractor.

In accordance with an aspect herein, a positioning assist method is provided for assisting moving a loader carried on an associated tractor to one or more desired positions. The method includes imaging by an vision system of a position assist apparatus a set of one or more target devices carried on the loader, generating target device data by the vision system representative of the image of the set of one or more target devices, storing positioning assist logic in a non-transient memory device of a loader position control apparatus operatively coupled with the vision system, the loader position control apparatus comprising a processor device, a non-transient memory device operatively coupled with the processor device, and the memory device, executing the positioning assist logic by the processor device to determine based on the target device data a current height of the loader, and generate, based on the determined current height of the loader, current loader height data representative of the determined current height of the loader, and displaying based on the generated current loader height data a loader current height image by a display unit operatively coupled with the loader position control apparatus and comprising a screen that is viewable by an operator of the associated tractor, wherein the loader current height image is viewable by the operator of the associated tractor for assisting the operator move the loader to the desired position which is marked on display device with the help of processing device.

In any of the embodiments herein, the positioning assist method includes imaging by a vision system of a position assist apparatus a set of one or more target devices carried on the boom and/or tool carrier, generating target device data by the vision system representative of the image of the set of one or more target devices, storing positioning assist logic in a non-transient memory device of a loader position control apparatus operatively coupled with the vision system, the loader position control apparatus comprising a processor device, a non-transient memory device operatively coupled with the processor device, and the memory device, executing the positioning assist logic by the processor device to determine based on the target device data a current height of the loader including a boom height and/or carrier angle, and generate, based on the determined current height of the loader, current loader height data representative of the determined current height of the loader including the boom height and/or carrier angle, and displaying based on the generated current loader height data a loader current height image by a display unit operatively coupled with the loader position control apparatus and comprising a screen that is viewable by an operator of the associated tractor, wherein the loader current height image including boom height and/or carrier angle images is/are viewable by the operator of the associated tractor for assisting the operator move the loader to the desired position which is marked on display device with the help of processing device.

BRIEF DESCRIPTION OF THE DRAWINGS

In the accompanying drawings which are incorporated in and constitute a part of the specification, embodiments of the disclosure are illustrated, which, together with a general descriptions given above, and the detailed description given below, serve to exemplify the embodiments of this disclosure.

DETAILED DESCRIPTION

In the following description reference is made to the accompanying figures which form a part thereof, and in which is shown, by way of illustration, one or more example embodiments of the disclosed systems and methods that assist an operator perform activities with a loader of a work vehicle including providing assistance to an operator of a vehicle for loader positioning for coupling an attachment onto a tool carrier on a free end of the loader, and for providing implement height and level detection for performing work functions with the implements including performing repeated work functions automatically, and for approaching and engaging workpieces with the implements. Various modifications of the example embodiments may be contemplated by on of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" or "one or more of A, B, and/or C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Figure 1:
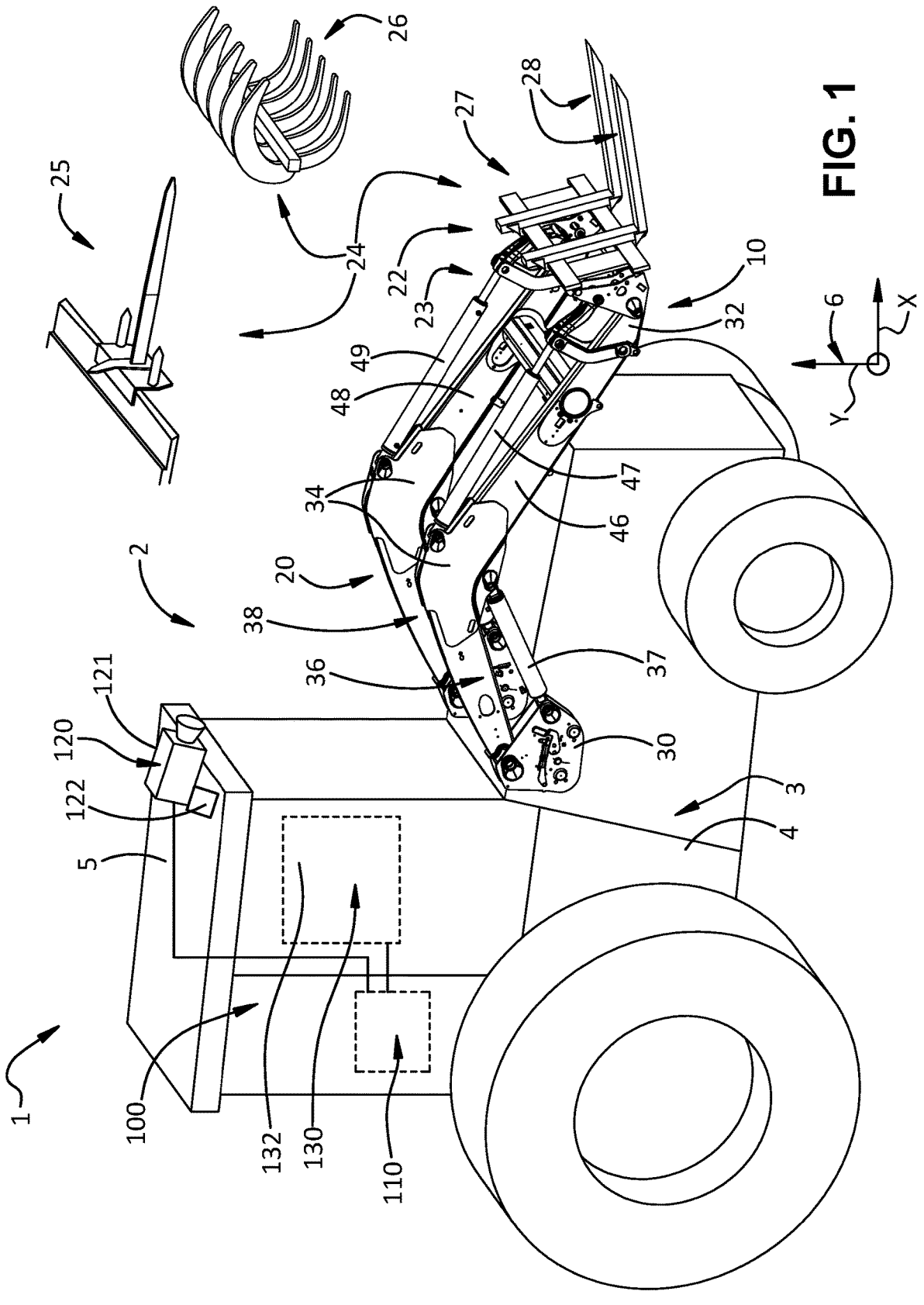
FIG. 1 is a side view of a work vehicle including a positioning assist apparatus according to example embodiments of the present disclosure.

Referring now to the drawings, wherein the showings are only for the purpose of illustrating the example embodiments only and not for purposes of limiting the same, FIG. 1 illustrates a work vehicle 1 that may be used with the positioning assist apparatus 100 according to example embodiments of the present disclosure. In the embodiment illustrated, the work vehicle 1 is a tractor 2 but it is to be appreciated that the embodiments herein are not limited to use with tractors or use with any particular mobile material handling equipment. For example, the work vehicle 1 may be a tractor without a cab such as for example an open station tractor, or a construction equipment work vehicle such as for example a construction loader. These are merely examples and the embodiments of the positioning assist apparatus 100 described herein are adapted for operation in any work vehicle now known or hereinafter developed. The positioning assist apparatus 100 of the example embodiments herein may execute or otherwise perform loader position indication functions including providing loader height and/or level indication, and also including providing loader height and/or level indication for assisting an operator move and position the boom and/or tool carrier of the loader to one or more desired position(s). The system 100 may be exercised in an operator assist mode using visual cues regarding current and desired boom and/or tool carrier position(s), and in a semi-automated operator assist mode for assisting the operator by automatically moving the boom and/or tool carrier to desired position(s) of a sequence of operations of a work task.

To provide a useful, albeit non-limiting example, the positioning assist apparatus 100 of the example embodiments is described below in conjunction with a particular type of work vehicle 1, shown in the form of a tractor 2, equipped with particular types of work implements 24 such as a pallet fork implement 27, a bale spear implement 25, a grapple implement 26, etc. included in an front end loader (FEL) attachment. The following notwithstanding, it is emphasized that embodiments of the positioning assist apparatus 100 may be deployed onboard various other types of work vehicles having one or more movable implements attached thereto. The positioning assist apparatus 100 of the example embodiment shown may physically and/or electronically adjust one or more operational characteristics of the one or more imaging and/or perception devices or sensors such as the vision system 120 including for example the vision sensor device 121, or other optical and/or imaging or perception device(s) in response to movement of various different types of work implements without limitation. The positioning assist apparatus 100 may be distributed as an integral part of a work vehicle, as an integral part of a loader 10 attachment or other module that may be removably attached to and detached from a work vehicle on an as-needed basis, or as a discrete assembly or multi-component kit that may be installed on an existing work vehicle via retrofit attachment. The vision system 120 is operable in general to image a set of one or more target devices 310 (FIG. 3) carried on the loader 10 to generate target device data representative of the image of the set of one or more target devices. The generated target device data is used to determine a current pose of the loader including for example a current position, height, and/or lever of the loader for providing to the operator for informational uses, and to automatically position the loader for automated load handling. It is to be appreciated that the vision system 120 is further operable to image a set of additional one or more target devices (not shown) carried on implements decoupled from the tool carrier 22 and/or on associated loads such as for example containers, bales, piles of bulk materials, or the like, to generate target device data representative of the image of the set of additional one or more target devices. The generated target device data relating to the set of additional one or more target devices may be used to help to align the loader with the decoupled implements and/or the associated loads for providing information to the operator for assisting the operator with load handling and implement attachment onto the tractor 2.

The vision sensor device 121 may include one or more imaging devices such as for example one or more camera devices operable to generate image data representative of an image of objects and background within the field of view of the one or more cameras. The cameras may be monocular cameras, stereo cameras, and may include for example any one or more devices that use sensing technology to determine the position, velocity, or other characteristics of objects in the field of view by analysis of pulsed laser light reflected from their surfaces. Such devices may use Light Detection and Ranging (LIDAR) technologies. In further addition, the vision sensor device 121 may include one or more devices that are operable to generate image data representative of an image of objects and background within the field of view of the one or more cameras using Radio Detection and Ranging (RADAR) technologies, for example.

In some examples, the vision sensor device 121 can be mounted on the cab facing forwards toward the bucket, attachment, or other work tool. For example, the camera can be mounted on the front surface of the cab 5 or the top surface (e.g., roof) of the cab 5. However, it is to be appreciated that the vision sensor device 121 can be mounted anywhere on the tractor 2 as may be convenient or desired and, in particular, can be mounted anywhere on tractors without cabs structures or the like. The vision sensor device 121 can transmit images (or video signals) wirelessly to a display or though wiring that extends along an arm, boom, or other frame structure of the work vehicle to the display. In other examples, the camera can be mounted on an arm of the work vehicle, including the lower surface, upper surface, or sides of the arm structure used to support the bucket, attachment, or other work tool or device used during operation of the work vehicle. Alternatively, the camera can be mounted on a boom of the work vehicle, including the lower surface, upper surface, or sides of the boom that is commonly used to support the arm and is attached to the main body of the work vehicle. Still further the vision sensor device 121 may be mounted to the hood or in an area near the hood and/or anywhere else as may be necessary or desired to obtain suitable complete attachment image views in vehicles of other types such as for example open station tractors, harvesters, construction equipment loaders, etc.

FIG. 1 is a side perspective view of a tractor 2 including a front end loader 10 attachment and a positioning assist apparatus 100, as illustrated in accordance with an example embodiment of the present disclosure. The positioning assist apparatus 100 is only partially shown in FIG. 1 and an example embodiment of which will be described more fully below in conjunction with FIG. 2. First, however, a general description of the tractor 2 is provided to establish an example context in which the positioning assist apparatus 100 may be better understood. In addition to the loader 10 attachment and the vision system 120, the tractor 2 includes a vehicle body 3 having a chassis 4, and a cab 5. The tractor 2 is generally bilaterally symmetrical about its longitudinal axis, which is parallel to the X-axis identified in FIG. 1 by coordinate legend 6.

In accordance with an example embodiment and as will be described in greater detail below, the visual offset movement instructions provide instructions to the operator for laterally moving the loader in the horizontal plane X relative to the implement in directions perpendicular to a forward direction of the tractor for mutually coupling the carrier and implement attachment features. The visual inclination movement instructions also provide instructions to the operator for moving the loader relative to the implement about the vertical or yaw axis Y perpendicular to the forward direction of the tractor such as by steering the tractor to the left and/or right while moving forward or backwards for mutually coupling the carrier and implement attachment features.

In the illustrated embodiment, the work vehicle 1 includes a loader 10 provided for material handling of an associated load. The loader 10 of the work vehicle 1 illustrated includes an articulated boom 20 having a tool carrier 22 on a free end 23 of the boom 20. The tool carrier 22 portion of the loader 10 may be for example a receiver mechanism or other similar device or apparatus provided on the free end 23 of the boom 20 for enabling coupling of an attachment such as an implement or a tool for example with the free end 23 of the boom 20. In this regard, the tool carrier 22 is selectively mutually connectable with one or more various attachments, tools or implements 24 such as for example a bale spear implement 25, a grapple implement 26, a pallet fork implement 27 having a set of pallet tines 28, a gripper (not shown), a bail hugger (not shown), a bale spear (not shown), and/or various working devices as may be available and/or desired. Each of the various tools or implements 24 has a preferred and possibly unique implement approach path providing a preferred route for accessing an attachment feature of the respective implement that is mutually coupleable with a corresponding carrier attachment feature of the tool carrier. In general, the subject positioning assist apparatus 100 generates information and signals relating to a position, height, and/or level of the boom and/or of an implement carried on the boom for providing positional information to the operator for helping the operator position the loader and/or implement. The subject positioning assist apparatus 100 may also generate signals that may be used for automatically positioning the boom to desired positions, heights, and/or levels for automated loader tasks and/or for automatically positioning the implement carried on the boom to desired positions, heights, and/or levels.

The articulated boom 20 of the loader 10 movably mounts the tool carrier 22 carrying a selected one of the one or more various attachments, tools or implements 24 to a forward portion of the vehicle body 3 and, more specifically, mounts the tool carrier 22 to chassis 4. In the illustrated example, the pallet fork implement 27 is shown attached with the tool carrier 22 but it is to be appreciated that the pallet fork implement 27 may be replaced by any different type of work implement, such as any of the bale spear implement 25, the grapple implement 26, a gripper, a bail hugger, ta bucket, all as mentioned above, or any other work implement as necessary and/or desired, in alternative embodiments of the tractor 2. The articulated boom 20 assembly may assume any form capable of moving the work implement 24 relative the vehicle body 4 in response to operator commands. In the example embodiment shown in FIG. 1, the boom assembly 20 includes a system of linkages, hydraulic cylinders, plumbing lines (not shown), and other components suitable for this purpose. More specifically, the boom assembly 20 includes an aft bracket set 30 affixed to the vehicle body 4, a forward bracket set 32 to which the tool carrier 22 carrying the pallet fork implement 27 is pivotally attached, and an intermediate or mid bracket set 34 between the aft and forward bracket sets 30, 32. Twin lift arms 36, 38 pivotally attach the aft bracket set 30 with the mid bracket set 34, which is, in turn, attached with the forward bracket set 32 by twin implement arms 46, 48. Lift cylinders 37, 39 (only one of which can be seen) are further coupled between the aft bracket set 30 and the mid bracket set 34, while bucket cylinders 47, 49 are coupled between the mid bracket set 34 and the forward bracket set 33.

It is to be appreciated that the height of the boom assembly 20 (the "boom height") is set by controlling the lift cylinders 37, 39 to extend (raising the boom assembly) and to retract (lowering the boom assembly). It is to further be appreciated that the angle of the tool carrier 22 (the "carrier angle") is set by controlling the bucket cylinders 47, 49 to retract (pitching the tool carrier upwardly relative to the ground/boom), and to extend (pitching the tool carrier downwardly relative to the ground/boom). From the above therefore, and because the loader includes the boom assembly and the tool carrier on the end thereof, "loader height" is set by controlling a combination of the lift cylinders 37,

39 to extend (raising the boom assembly) and to retract (lowering the boom assembly) and by controlling the bucket cylinders 47, 49 to retract (pitching the tool carrier upwardly relative to the ground/boom), and to extend (pitching the tool carrier downwardly relative to the ground/boom). An embodiment herein is directed to systems and methods that provide a loader height and/or level indication to an operator, wherein the loader height and/or level indication essentially reflects an indication of a height and/or level of the tool carrier on the end of the boom. The "loader height and/or level" may therefore be referred to equivalently as "tool carrier height and/or level." In addition, "loader height" may essentially reflect an indication of a pose of the tool carrier. The indication of a pose of the tool carrier takes into consideration and includes an angle of inclination of the tool carrier (the "carrier angle") and a height of a loader boom (the "boom height") carrying the tool carrier. In any of the embodiments herein the angle of the tool carrier of the loader may comprise the angle of the tool carrier relative to the ground beneath the tractor carrying the loader or, equivalently, the angle of the tool carrier relative to a plane that remains level for all positions and orientations of the tractor carrying the loader. In any of the embodiments herein, the indication of the pose of the tool carrier takes into consideration and includes the height of a loader boom (the "boom height") and an angle of inclination of an implement or surface and/or geometric feature of the implement when such implement is coupled with the tool carrier (the "carrier angle"). The angle of the implement or surface and/or geometric feature of the implement may comprise the angle of the implement or surface and/or geometric feature of the implement relative to the ground beneath the tractor carrying the loader or, equivalently, the angle of the implement or surface and/or geometric feature of the implement relative to a plane that remains level for all positions and orientations of the tractor carrying the loader.

In addition, the system and method described herein provide the operator of the associated work vehicle 1 with assistance for properly locating the tool carrier 22 on the free end 23 of the boom 20 at a desired position, height, and/or level relative to the ground for training the system for automated operations and semi-automated (visual "assist") operations such as for example return to position (RTP) operation, sequential return to positions operation, and also for providing further visual aids such as images or the like for assisting in properly tilting the tool carrier 22 to a desired height, orientation and/or inclination for enabling coupling of the carrier 22 with the selected attachment 24 for training the system for the automated and semi-automated operations, and further for positioning the work vehicle 1 relative to the selected implement 24 for moving the vehicle 1 supporting the tool carrier 22 into a coupling relationship with the selected implement 24 for mutually connecting the tool carrier 22 with the selected implement 24 for training the system for the automated and semi-automated operations.

The loader 10 attachment further includes other features, such as hydraulic lines and control valves, which are not shown in FIG. 1 for simplicity. When the loader 10 is mounted to the vehicle body 4, the hydraulic lines of the loader 10 are fluidly connected to a pressurized hydraulic fluid supply on the tractor 2 in a manner permitting an operator seated within the cab 5 to control the cylinders 37, 39, 47, and 49. Beginning from a ground position, an operator may command the boom assembly 20 of the loader 10 to lift the tool carrier 22 with and/or without the pallet fork implement 27 or any other implements carried on the tool carrier 22 as shown by controlling the lift cylinders 37, 39 to extend. As the lift cylinders 37, 39 retract, the boom 20 comprising the pallet fork implement 27 when so carried on the tool carrier 22 is lowered from a full height position to a lowered position. In the process of moving from the full height position to the lowered position, the boom 20 travels through the intermediate or mast level position shown in FIG. 1. Similarly, as the bucket cylinders 47, 49 extend in response to operator commands, the boom assembly 20 tilts the pallet fork implement 27 when so carried on the tool carrier 22 from the upright position through an intermediate position to the forward-facing lift position. Conversely, the operator may control the boom assembly 20 to stroke cylinders 37, 38, 47, 48 in a manner opposite to that just described to return the pallet fork implement 27 when so carried on the tool carrier 22 from the grounded, forward-facing lift position to the raised full height position.

It is to be appreciated that the motion of the cylinders 37, 39, 47, and 49 may be controlled directly by operator manipulation of various levers, pedals and/or other human interface device(s) operatively coupled with hydraulic control components of the system, and further that the motion of the loader 10 may be indirectly controlled by the operator rendering motion commands to via the positioning assist apparatus 100 which in turn may operate the various hydraulic control components of the system for moving the cylinders 37, 39, 47, and 49 thereby effecting the desired movement of the loader 10. It is still further to be appreciated that the motion of the cylinders 37, 39, 47, and 49 may be controlled by the positioning assist apparatus 100 automatically and/or semi-automatically in response to generalized operator commands such as for example to automated commands wherein for example the positioning assist apparatus 100 may function in an automated mode to automatically return the boom 20 overall, portions of the boom 20 such as for example the lift arms 36, 38 and/or the implement arms 46, 48, the various attachments, tools or implements 24 when so carried on the tool carrier 22, to one or more pre-stored position(s) in response to operator input. It is to be appreciated that all of the above operations and movements may be performed prior to attaching any of the various work implements 24 with the tool carrier 22.

In the example embodiment shown in the Figures, the empty tool carrier 22 and/or the implements 24 when so carried on the tool carrier 22 are moved by the boom 20 along a vertical plane containing or parallel to the longitudinal axis of the body 4 of the tractor 2 (corresponding to an X-Y plane in coordinate legend 6). The vision system 120 thus need only have a field of view (vertical in the example embodiment) rotatable about a single rotational axis to remain trained on the empty tool carrier 22 and/or on the implements 24 when so carried on the tool carrier 22 throughout the range of motion of the loader 10 relative to the body 4 of the tractor 2. For the vision sensor device 121 shown this rotational axis is parallel to the lateral axis of the tractor 2; a "lateral axis" of the tractor 2 (or other work vehicle) defined as an axis extending within a horizontal plane (an X-Z plane in coordinate legend 6) and perpendicular to the longitudinal axis of the tractor 2. Stated differently, a lateral axis of tractor 2 is parallel to the Z-axis in coordinate legend 6, and vision sensor device 121 may be selectively rotatable in a further example embodiment about a rotational axis likewise parallel to the Z-axis, although in the example embodiment described herein the vision sensor device 121 remains fixed relative to the work vehicle 1 and in particular relative to the cab 5 of the tractor 2 and, as such remains fixed relative the a rotational axis likewise parallel to the Z-axis. In other embodiments wherein the positioning assist apparatus 100 is deployed onboard a work vehicle including a backhoe or other implement that is rotatable about a horizontal axis (corresponding to the Y-axis in coordinate legend 6), the vision sensor device 121 or other optical device or optical devices included within the positioning assist apparatus 100 may be selectively rotatable about multiple axes including an axis parallel to the horizontal axis.

The vision sensor device 121 or other optical device or devices included with the positioning assist apparatus 100 may also be imparted with additional degrees of freedom in further embodiments. For example, the vision sensor device 121 may be moved to translate along any axis in three dimensional space, as appropriate to better visually capture the pallet fork implement 27 or other implement 24 throughout its full range of motion relative to the body 4 of the tractor 2. For example, and as may be appreciated, the vision sensor device 121 may be mounted on a telescopic post 122 that extends vertically upward when the pallet fork implement 27 or other implement 24 is moved into the full height position to provide a better vantage point for observation of markers on the pallet fork implement 27 or other implement 24 as will be described below to minimize the degree to which the boom assembly 20 visually obstructs the camera's view of the pallet fork implement 27 or other implement 24. In addition, the positioning assist apparatus 100 may electronically adjust one or more operational characteristics of the one or more imaging devices such as the vision system 120 including for example the vision sensor device 121, or other optical device(s) in response to movement of various different types of work implements without limitation to minimize the degree to which the boom assembly 20 visually obstructs the camera's view of the pallet fork implement 27 or other implement 24.

The articulated boom 20 may be maneuvered such as by actuating various hydraulic cylinders 37, 39, 47, 49 to extend or retract and to lower or raise an articulated boom 20 relative to the work vehicle so that the tool carrier 22 may be positioned for coupling the boom 20 with the one or more various implements 24. The tool carrier 22 disposed on the end of the boom 20 collectively forms a loader 10 in accordance with the example embodiments. In an example embodiment herein, the one or more various implements 24 may be initially considered as a workpiece prior to being coupled with the tool carrier 22 of the loader 10 wherein an operator may desire for the one or more various implements 24 and the tool carrier 22 to be mutually latched joined or otherwise mechanically coupled prior to performing a material handling task or the like. As an example, an operator may wish to couple the pallet fork implement 27 with the tool carrier 22 prior to proceeding to approach, lift, and place a palletized load at a desired location.

In accordance with an example embodiment and as will be described in greater detail below, the positioning assist apparatus 100 provides assistance to an operator with regard to properly locating the boom 20 and the tool carrier 22 carried on the free end 23 of the boom 20 at a desired height and in particular at a desired height relative to the ground, and also for providing further visual aid information for assisting in properly raising, lowering and/or tilting the tool carrier 22 to a desired orientation or inclination for enabling coupling of attachment features of the tool carrier 22 with corresponding attachment features of the selected implement 24, and further for positioning the selected implement 24 carried on the tool carrier 22 relative to a load or workpiece for properly engaging the load or workpiece with the selected implement 24 to perform a work operation. In addition and following attaching the implement 24 with the tool carrier 22, the positioning assist apparatus 100 provides assistance to an operator with regard to boom and/or implement height and level detection for performing work functions with the implements, including repeated work functions for training the system for automatic and semi-automatic operations or the like.

In addition, the methods and systems described herein provides the operator of the associated work vehicle 1 assistance for properly locating the tool carrier 22 on the free end 23 of the boom 20 at a desired height relative to the ground for training the system for automatic and semi-automatic operations, and also for providing further visual aid such as images and the like for assisting in properly raising, lowering and/or tilting the tool carrier 22 to a desired orientation or inclination for enabling coupling of the carrier 22 with the selected attachment 24 for training the system for the automatic and semi-automatic operations, and further for positioning the work vehicle 1 relative to the selected implement 24 for moving the vehicle 1 supporting the tool carrier 22 into a coupling relationship with the selected implement 24 for mutually connecting the tool carrier 22 with the selected implement 24 for training the system for the automatic and semi-automatic operations, and still further for approaching loads at desired tool carrier heights and angles for manipulating the loads.

The vision system 120 is leveraged to work together with the logic of the positioning assist apparatus 100 executed by the processor to function as an implement position sensor by providing the images captured by the positioning assist apparatus 100 to the loader position control unit of the apparatus for image processing to determine the current location of the bucket or other implement relative to the body of the tractor and/or relative to the ground under the tractor. In that way, the vision system 120 together with the logic executed by the processor of the loader position control unit of the apparatus may operate as an automatic and/or semi-automatic operational system utilized to automatically or semi-automatically return the loader, boom arm, and implements such as a bucket to a pre-stored position in response to operator input. The vision system 120 together with the logic executed by the processor effectively provides for directly or indirectly monitoring the position of the bucket relative to the body of the tractor in lieu of the need for physical implement position sensors such as linear transducers or the like to monitor the stroke position of cylinders. The vision system 120 provides the boom stroke position and other data related to the inclination of the implement on the boom in an essentially continual manner.

In accordance with an example embodiment, the positioning assist apparatus 100 includes a loader position control apparatus 110, an vision system 120 such as an vision sensor device 121 mounted on the associated work vehicle 1 and operatively coupled with the loader position control apparatus 110, and a display unit 130 operatively coupled with the loader position control apparatus 110. As appearing herein, the term "vision sensor device" refers to an optical device, a camera system, electrical light, or other device that generates and/or detects visible and/or invisible light or other electromagnetic radiation. The vision sensor device 121 may include one or more cameras operable to generate image data representative of an image of objects and background within the field of view of the one or more cameras. The cameras may be monocular cameras, stereo cameras, and may include for example devices that use optical sensing technology to determine the position, velocity, or other characteristics of objects in the field of view by analysis of pulsed laser light reflected from their surfaces. Such devices may use Light Detection and Ranging (LIDAR) technologies. In further addition, the vision sensor device 121 may include one or more cameras operable to generate image data representative of an image of objects and background within the field of view of the one or more cameras using Radio Detection and Ranging (RADAR) technologies, for example. The loader position control apparatus 110 includes a processor device 204 (FIG. 2) and a non-transient memory device 210 (FIG. 2) operatively coupled with the processor device 204 in a manner to be described in greater detail below. The memory device 210 stores positioning assist logic 211 (FIG. 2) executable by the processor device 204 to determine a current height of the loader based on target device data generated by the vision system 120. The positioning assist logic 211 is further executable by the processor device 204 to generate, based on the determined current height of the loader, current loader height data representative of the determined current height of the loader. The display unit 130 is operable to display on a screen 132 thereof, based on the current loader height data, a loader current height image viewable by the operator of the associated tractor 2 for assisting the operator move the loader to the desired position.

In accordance with an example embodiment, the positioning assist logic 211 is executable by the processor device 204 to determine a current boom height and/or carrier angle based on target device data generated by the vision system 120. The positioning assist logic 211 is further executable by the processor device 204 to generate, based on the determined current boom height and/or carrier angle, current boom height and/or carrier angle data representative of the determined current boom height and/or carrier angle. The display unit 130 is operable to display on a screen 132 thereof, based on the current boom height and/or carrier angle data, a loader current boom height and/or carrier angle image viewable by the operator of the associated tractor 2 for assisting the operator move the boom and/or the tool carrier of the loader to their desired position(s).

The display unit 130 can be positioned in the cab 5 or elsewhere in or on the work vehicle 1. The display unit 130 can be positioned so as to be viewable by the operator while the operator manipulates the work vehicle's controls to perform a task. And the display unit 130 can be positioned so as not to hinder the opening or closing of any latches, hatches, windows, or doors of the work vehicle 1. The display can be mounted on the vehicle anywhere as may be convenient or desired, such as to a rollover protection structure (ROPS), directly or via a mounting device. This can enable the operator to view the display while operating the controls of the work vehicle. In other examples, the display unit 130 can be positioned, for example, by using a vertical support pillar that forms the structure of the ROPS. The vertical support pillar can be located in front of the operator or behind the operator while the operator is seated in the cab 5. Additionally or alternatively, the display unit 130 can be positioned using a cross member that spans across a vertical support pillar. The cross member can be positioned in front of, behind, or on the sides of the operator while the operator is seated in the vehicle 1. The display unit 130 can additionally or alternatively be positioned on a supporting structure used for the controls (e.g., pilot controls) used to operate the work vehicle 1. The controls can control the rotation of the work vehicle 1; the boom 20, arm, or work tool 24; or any combination of these. In some examples, the display unit 130 can be an existing monitor in the work vehicle that typically shows other information, such as operating parameters (e.g., engine speed, fuel level, and engine temperature) of the work vehicle. In such an example, the monitor may be modified to perform the functionality of the display unit 130.

The vision sensor device 121 of the positioning assist apparatus 100 is operable to obtain an image of the loader 10 of the associated work vehicle 1 and to generate work area image data representative of an image of the loader 10 and of a work area adjacent to the tractor. In particular, the vision sensor device 121 is operable to image a set of one or more target devices 310 (FIG. 3) carried on the loader 10 to generate target device data representative of the image of the set of one or more target devices. Further in particular, the vision sensor device 121 is operable to image a set of one or more boom target devices 320 (FIG. 3) carried on a boom 20 of the loader 10, and a set of one or more tool carrier target devices 330 (FIG. 3) carried on the tool carrier 22 of the loader 10, and to generate boom target device data representative of the image of the set of one or more boom target devices 320 and tool carrier target device data representative of the image of the set of one or more tool carrier target devices 320. It is to be appreciated that although only a single vision sensor device 121 is shown for ease of illustration mounted to the work vehicle 1 at the position shown, the vision sensor device 121 shown is merely representative of a set of one or more camera devices or the like that may include several connected camera devices that can be mounted on or near the vehicle or anywhere as may be necessary or desired such as for example on other areas of the work vehicle or on portions of the loader itself in order to obtain as many images of the tool carrier and/or on the tool carrier as may be necessary and/or desired for providing images of the tool carrier over the full relevant range of movement or motion of the loader.

Figure 2:
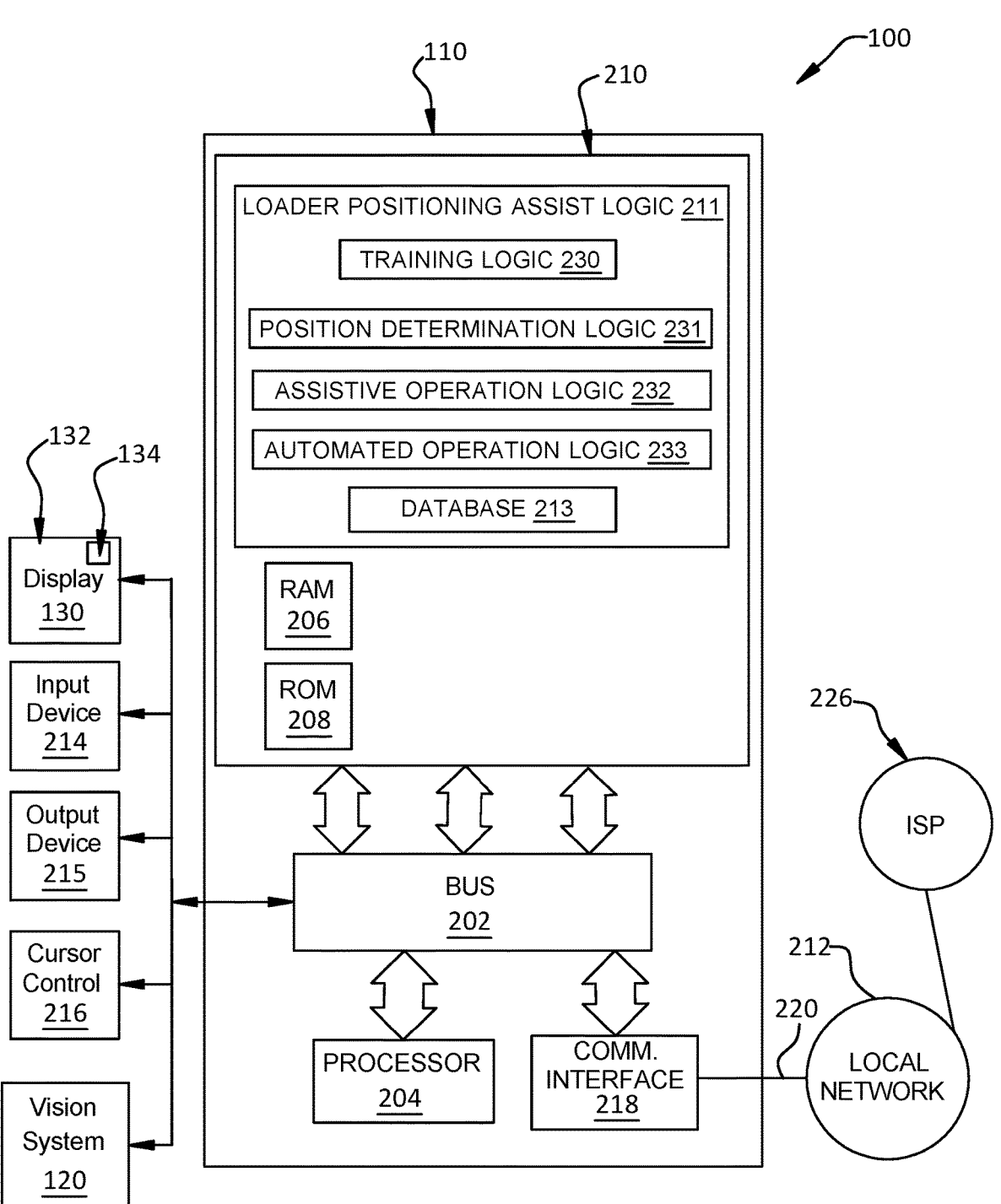
FIG. 2 is a hardware block diagram that illustrates a representative positioning assist apparatus according to the example embodiments.

FIG. 2 is a block diagram that illustrates a representative positioning assist apparatus 100 according to the example embodiments. The positioning assist apparatus 100 is suitable for executing embodiments of one or more software systems or logic modules that perform methods for assisting an operator of an associated work vehicle by providing boom and implement height and level detection for performing work functions with the loaders and implements including single movement operations as well as multiple movement operations automatically, semi-automatically, and repeatedly as desired, wherein the work functions may include for example raising and/or lowering the loader 10 to a desired height and/or position, and raising and/or lowering the loader 10 to one or more desired heights and/or positions in accordance with a predefined sequence of movements. The work functions may also include for example raising and/or lowering the boom 20 and/or tool carrier 22 portions of the loader 10 to desired heights and/or positions, and raising and/or lowering the boom 20 and/or tool carrier 22 portions of the loader 10 to one or more desired heights and/or positions in accordance with a predefined sequence of movements. In an example, the lift arms 36, 38 and/or the implement arms 46, 48 may be moved to a desired height and/or position, and/or they may further be moved to one or more desired heights and/or positions in accordance with a predefined sequence of movements. The work function operations may be for any purpose including for example for coupling a tool carrier on the end of the loader with an implement attachment, for approaching a workpiece, for engaging a workpiece with an implement, for manipulating the workpiece such as for example to lift a workpiece from an initial location, carry the workpiece to another location, and place the workpiece at a second location, or the like.

The representative positioning assist apparatus 100 according to the example embodiments comprises a loader position control apparatus 110 that includes a bus 202 or other communication mechanism for communicating information, and a processor device 204 coupled with the bus for processing information including executing logic or other executable code or the like. The position control apparatus 110 further includes a main non-transitory memory device 210 that may comprise one or more memory portions or components or collection of other devices such as random access memory (RAM) 206 or other dynamic storage device for storing information, instructions, and/or logic to be executed by the processor device 204, and a read only memory (ROM) 208 or other static storage device for storing static information and instructions for the processor device 204. The memory device 210 is also suitably provided for storing the positioning assist logic 211 comprising instructions for execution by the processor, and other information including for example data and instructions for execution by the processor for determining a position, height, and/or level of the loader and/or of an implement carried on the boom for providing positional information to the operator for helping the operator position the loader and/or implement and displaying images thereof on the screen 132 of the display unit 130 that is viewable from an operator's seat of the associated work vehicle 1, and for generating signals that may be used to automatically position the boom to desired positions, heights, and/or levels for automated loader tasks and/or to automatically position the implement carried on the boom to desired positions, heights, and/or levels. The visual images may be displayed for helping to guide the user in operating the loader to position a boom relative to the work vehicle, to position the boom and/or tool carrier relative to level ground, to position the tool carrier 22 on the free end 23 thereof relative to the one or more various attachments or implements 24 to be coupled with the carrier 22, and to position the one or more various attachments or implements 24 relative to the boom and/or relative to the ground for manipulating workpieces such as crops or the like.

In accordance with an example embodiment, the non-transient memory device 210 may further include a database 213 that stores desired loader position data representative of the desired positions of the loader. The database 213 may store desired boom height data and/or desired carrier angle data collectively as representative of the desired positions of the loader. The non-transient memory device 210 may further include training logic 230, position determination logic 231, assistive operation logic 232, and automated operation logic 233.

The processor device 204 is operable to execute the training logic 230 to, in general, generate loader task data during a training session in a configuration mode of the positioning assist apparatus 100, wherein the loader task data is representative of a desired operation to be performed by the loader and comprises a first set of loader height command data in accordance with an example embodiment, wherein the first set of loader height command data is representative of an ordered sequence of loader heights to assume by the loader to perform the desired operation.

The processor device 204 is further operable to execute the position determination logic 231 to, in general, determine the height of the boom of the loader based in accordance with an example embodiment on the target device data generated by the vision system 120 imaging a set of one or more target devices carried on or otherwise provided on the loader. As used herein and throughout, "height of the loader" and "loader height" include boom height and/or carrier angle. Also as used herein and throughout, "position of the loader" and "loader position" include boom height and carrier angle. Still also as used herein and throughout, "pose of the loader" and "loader pose" include boom height and carrier angle. In any of the embodiments herein, the indication of the pose of the tool carrier takes into consideration and includes the height of a loader boom (the "boom height") and an angle of inclination of an implement or surface and/or geometric feature of the implement when such implement is coupled with the tool carrier (the "carrier angle"). The angle of the implement or surface and/or geometric feature of the implement may comprise the angle of the implement or surface and/or geometric feature of the implement relative to the ground beneath the tractor carrying the loader or, equivalently, the angle of the implement or surface and/or geometric feature of the implement relative to a plane that remains level for all positions and orientations of the tractor carrying the loader.

The processor device 204 is still further operable to execute the assistive operation logic 232 to, in general, determine a difference between a desired loader height and a current loader height and to generate loader movement command data representative of an incremental movement instruction required for effecting movement of the loader from the determined current loader height to the desired loader height. In an embodiment a loader movement instruction image is displayed based on the generated loader movement command data. The loader movement instruction image is viewable by the operator of the associated tractor 2 for visually communicating to the operator the determined difference between the desired loader height and the determined current loader height for assisting moving the loader to the desired loader height In this way, the positioning assist apparatus 100 provides assistive operation for assisting the operator in moving the loader to the desired loader height.

The processor device 204 is yet still further operable to execute the automated operation logic 233 to generate a control signal controlling one or more cylinders 37, 39, 47, and 49 of the loader 10 based on a current loader height and the desired loader height to move the loader 10 from the current height to the desired height in response to a suitable command received by the positioning assist apparatus 100 such as may be received from the operator of the tractor using an input device or the like for example. The loader position control apparatus 110 is operable to deliver a loader movement control signal to a controller of the associated tractor 2 to control the one or more cylinders 37, 39, 47, and 49 of the loader 10 to automatically move the loader 10 from the determined current loader height to the desired loader height in response to the controller receiving a loader movement control signal such as may be received from the operator of the tractor using the input device or the like for example.

In accordance with an example embodiment, the database 213 in the non-transient memory device 210 may store desired loader position data representative multiple desired positions of the loader for the automated and semi-automated "assistive" operations. The database 213 may store desired boom height data and/or desired carrier angle data representative multiple desired positions of the boom height and/or carrier angle collectively as representative of the multiple desired positions of the loader for the automated and semi-automated "assistive" operations.

The example embodiments described herein are related to the positioning assist apparatus 100 performing a method providing visual images that assist an operator of an associated work vehicle to maneuver a loader of the associated work vehicle to couple an implement or other attachment onto a tool carrier of the loader, and to engage and manipulate a load with a tool carried on the end of the loader boom. Loader height images displayed on a screen 132 of a display unit 130 visually communicate a determined current loader height to the operator that may be compared with an image of a desired loader height for assisting moving the loader to the desired loader height. In accordance with an example, a set of desired loader heights may be displayed in sequence on the screen 132 for visually communicating to the operator determined differences between further desired loader heights and determined further current loader heights for assisting moving the loader by the operator to the further desired loader heights in accordance with the sequence for performing an operator assistive loader operation.

According to one implementation in particular, boom height and/or carrier angle images displayed on a screen 132 of a display unit 130 visually communicate determined current boom height and/or carrier angle to the operator that may be compared with images of desired boom height and/or carrier angle for assisting moving the boom and/or tool carrier of the loader to the desired boom height and/or carrier angle. In accordance with an example, a set of desired boom heights and/or carrier angles may be displayed in sequence on the screen 132 for visually communicating to the operator determined differences between further desired boom heights and/or carrier angles and determined further current boom heights and/or carrier angles for assisting moving the boom and/or tool carrier of the loader by the operator to the further desired boom heights and/or carrier angles in accordance with the sequence for performing an operator assistive loader operation.

According to one implementation, information for the movement sequence of the loader operation may be read into main memory 206 from another computer-readable medium, such as storage device 210. Execution of the sequences of the loader positioning logic 211 instructions contained in storage device 210 and/or main memory 206 causes the processor device 204 to perform the process steps described herein. In an alternative implementation, hard-wired circuitry may be used in place of or in combination with software instructions to implement the example embodiments. Thus implementations of the example embodiments are not limited to any specific combination of hardware circuitry, software, logic, or combinations of hardware, software, and/or logic.

In accordance with the descriptions herein, the term "computer-readable medium" as used herein refers to any non-transitory media that participates in providing virtual guidance logic 211 instructions to the processor device 204 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, paper-tape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The virtual assist apparatus or controller 100 further includes a communication interface 218 coupled with the bus 202 which provides a two-way data communication coupling to a network link 220 that is connected to local network 212 such as for example a local network of the work vehicle 1 such as a Controller Area Network (CAN) bus or the like. The communication interface 218 may be a controller area network (CAN) card to provide a data communication connection to a compatible CAN bus. As another example, communication interface 218 may be a local area network (LAN) card to provide a data communication connection to a compatible LAN. For example, communication interface 218 may be an integrated services digital network (ISDN) card or a modem to provide a data communication connection to a corresponding type of telephone line. Wireless links may also be implemented. In any such implementation, communication interface 218 may be a wireless receiver/transmitter, i.e. a transceiver operable to send and receive electrical, electromagnetic, radio frequency (RF), and/or optical signals that carry data streams such as digital data streams representing various types of information.

Network link 220 typically provides data communication through one or more networks to other data devices. For example, network link 220 may provide a connection through a local network to a diagnostic host computer (not shown) of the like for supporting configuration of the system as desired or necessary. An Internet Service Provider (ISP) 226 may provide data communication services indirectly through the Internet via the network 212 or directly through the network link 220.

The example virtual assist apparatus or controller 100 can send messages and receive data, including program code, through the network(s), network link 220 and communication interface 218. In an Internet-connected example embodiment, the virtual assist apparatus or controller 100 is operatively connected with a plurality of external public, private, governmental or commercial servers (not shown) configured to execute a web application in accordance with example embodiments. The example virtual assist apparatus or controller 100 suitably includes several subsystems or modules to perform the virtual operator's guidance as set forth herein. A benefit of the subject application is to provide improved guidance by displaying offset and inclination movement guidance instructions on a screen 132 of a display unit 130 that is viewable from an operator's seat of the associated work vehicle for helping the operator to view current positions of the loader and tool mechanisms as well as to visualize preferred or recommended movements of the loader and tool carrier mechanisms to safely and efficiently couple the tool carrier with a tool to safely and efficiently attach the tool onto the tool carrier portion of the loader. An output device 215 may also be provided such as in the form of a sound generating device such as a speaker to help improve guidance assistance by generating audible guidance instructions in the form of audible instructions and/or suitable instructional noises such as beeps, voice messages or the like that can be heard from an operator's seat of the associated work vehicle for helping the operator to be alerted to current positions of the mechanisms as well as to be audibly instructed of preferred or recommended paths for movement of the loader and/or tool carrier mechanisms to safely and efficiently load, unload, or otherwise couple the desired implement 24 with the tool carrier 22, and also to handle the material using the implement 24 received onto the carrier 22.

The example embodiment of the virtual assist apparatus further includes an input device 214 operatively coupled with the positioning assist apparatus. The input device 214 may be used during a training of the virtual assist apparatus for receiving a boom and tool carrier position training signal representative of the first predetermined target location alignment of the boom and tool carrier to establish a predetermined relative physical position between the tool carrier portion of the loader and a selected implement disposed on the ground adjacent to the associated work vehicle. In an example embodiment the input device 214 may include a touchscreen portion 134 of the display unit 130, a pointer device 216 operatively coupled with the positioning assist apparatus, a joystick 219 operatively coupled with the positioning assist apparatus or any other device or means of communicating training and other information to the control unit 110 of the virtual guidance assist apparatus 100.

In an example embodiment during system training in a configuration mode of the system, the operator may first position the boom 20 and tool carrier 22 to a desired position relative to the ground, then enter a command on the touchscreen 134 using a pointer or finger onto a selected portion of the menu image while the boom and tool carrier are in their desired positions, thereby identifying a boom position training signal representative of a selectable command on the screen for alignment of the boom and tool carrier to establish a desired relative physical position between the tool carrier and the implement relative to the ground. The desired relative physical position between the tool carrier and the implement relative to the ground may be represented as a desired height of the tool carrier and the implement relative to the ground, a desired level of the tool carrier and the implement relative to the ground, or both a desired height and level of the tool carrier and the implement relative to the ground.

Figure 3:
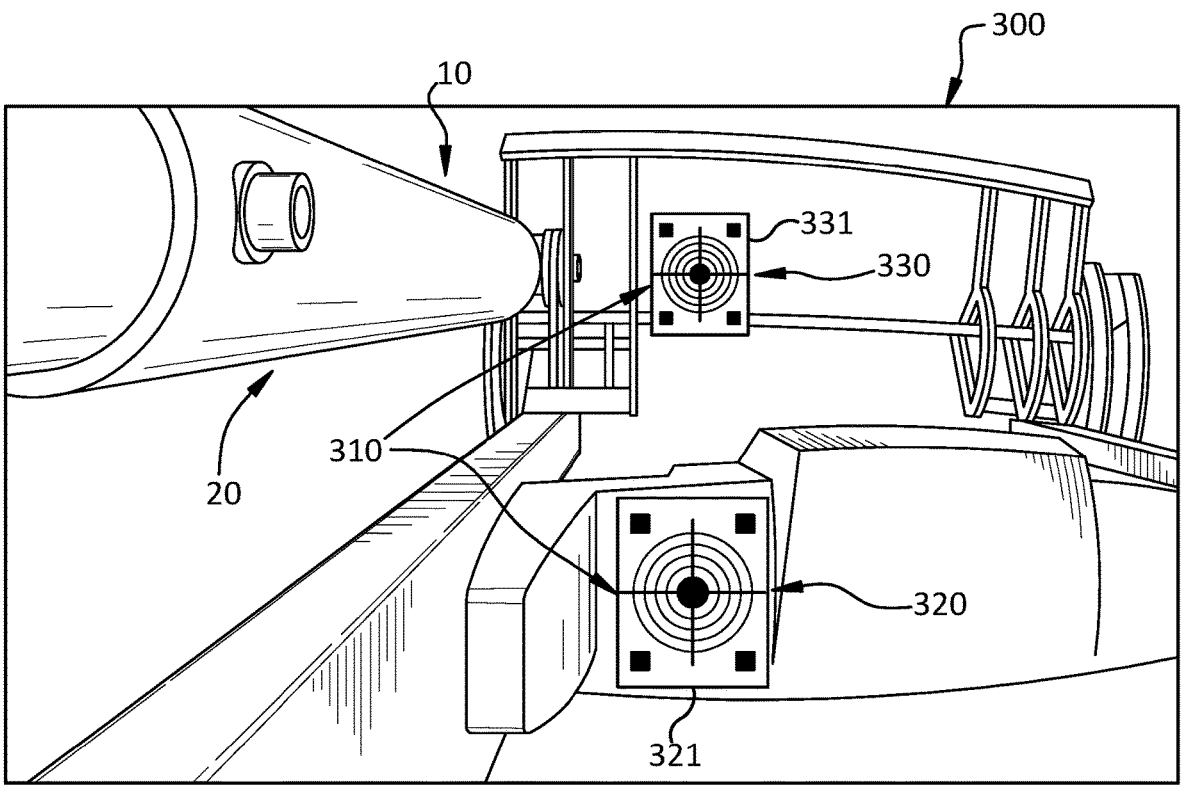
FIG. 3 is a diagram showing an image of equipment obtained by a vision system of the positioning assist apparatus in accordance with an example embodiment.

FIG. 3 is a diagram showing an image 300 of equipment obtained by an vision system 120 in accordance with an example embodiment. As described, the vision system 120 is operable to image a set of one or more target devices 310 carried on the loader 10 to generate target device data representative of the image 300 of the set of one or more target devices 310. In accordance with an example embodiment, the processor device 204 is operable to execute the positioning assist logic 211 to determine a current height of the loader based on the target device data representative of the image of the set of one or more target devices 310 generated by the vision system 120, and to generate current loader height data based on the determined current height of the loader, wherein in the example embodiment the current loader height data is representative of the determined current height of the loader.

In accordance with an example embodiment, the set of one or more target devices 310 includes a set of one or more boom target devices 320 carried on a boom 20 of the loader 10, and a set of one or more tool carrier target devices 330 carried on the tool carrier 22 of the loader 10. Overall, the set of one or more target devices 310 including the set of one or more boom target devices 320 and the set of one or more tool carrier target devices 330 are physical target devices having one or more physical properties that lend themselves for determination by the positioning assist apparatus 100 based on the obtained images thereof of a pose, inclination, orientation, or the like of the physical target devices 320, 330 relative to the vision system 120 and, hence, also of the pose, inclination, orientation, or the like of the boom and/or of the tool carrier relative to the work vehicle and/or relative to the ground beneath the vehicle owing to a mounting of the physical boom and tool carrier target devices 320, 330 on the boom and tool carrier at predetermined positions of the boom and tool carrier target devices on the boom and tool carrier respectively, and the relative positions thereof and the vision system 120. Physical target devices having such one or more physical properties that lend themselves for determination by the positioning assist apparatus 100 based on the obtained image of a pose, inclination, orientation, or the like of the physical target devices may include for example signage carrying positional indicia at predefined locations on the signage. Examples of such signage include but are not limited to include bar codes, Quick Response (QR) codes having position patterns at the corners of the QR code label, markers, or the like. Manufacturer's logos, or the like may also be provided on or at the boom and/or on or at the tool carrier on the end of the boom for imaging by the vision system 120 to determine from the obtained image a pose, inclination, orientation, or the like of the boom and/or of the tool carrier relative to the work vehicle and/or relative to the ground beneath the vehicle owing to a mounting of the physical boom target device in the example form of a manufacturer's logo or the like on the boom at a predetermined relative position between the target device and the boom and/or on the tool carrier at a predetermined relative position between the target device and the tool carrier. In the example embodiment illustrated, the boom and tool carrier target devices 320, 330 are devices 321, 331 carrying QR code information thereon.

In accordance with an example embodiment, the vision system 120 is operable to image a set of one or more boom target devices 320 carried on the boom 20 of the loader 10 to generate boom target device data representative of the image of the set of one or more boom target devices 320. In addition and in accordance with an example embodiment, the vision system 120 is operable to image a set of one or more tool carrier target devices 330 carried on the tool carrier 22 of the loader 10 to generate tool carrier target device data representative of the image of the set of one or more tool carrier target devices 320.

In accordance with an example embodiment, the processor device 204 is operable to execute the positioning assist logic 211 to determine the current height of the loader based on the boom target device data obtained by imaging the set of one or more boom target devices 320 carried on a boom 20 of the loader 10 and the tool carrier target device data obtained by imaging the set of one or more tool carrier target devices 330 carried on the tool carrier 22 of the loader 10, and generate the current loader height data representative of the determined current height of the loader based on the determined current height of the loader. The display unit 130 is operable to display a loader current height image on the screen 132 based on the generated current loader height data. In that way, the loader current height image is viewable by the operator of the associated tractor 2 for assisting the operator move the loader to the desired position.

Figure 4:
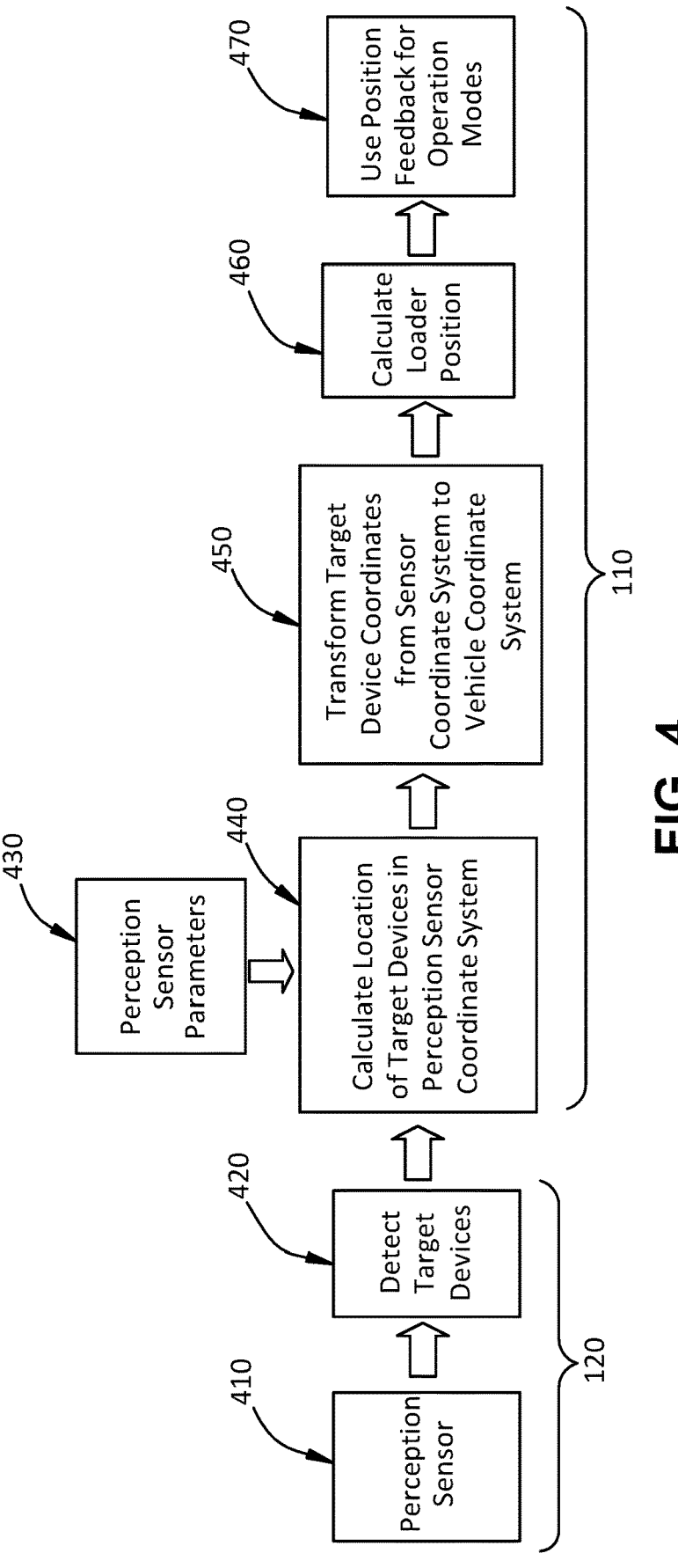
FIG. 4 is a diagram showing a functional flow of the positioning assist apparatus determining the height of the loader in accordance with an example embodiment.

FIG. 4 is a diagram showing a functional flow 400 of the positioning assist apparatus 100 determining the height of the loader 10 in accordance with an example embodiment. Overall, the processor device 204 is operable to execute logic 230 stored in the memory device 210 to generate information and signals relating to a position, height, and/or level of the boom 20 and/or of the tool carrier 22 carried on the boom and coupled with an implement 24 for providing positional information to the operator for helping the operator position the loader, boom, tool carrier, and/or implement. The subject positioning assist apparatus 100 may also generate signals that may be used for automatically positioning the boom to desired positions, heights, and/or levels for automated loader tasks and/or for automatically positioning the tool carrier 22 and implement 24 to desired positions, heights, and/or levels.

At 410 an image is obtained. In an example embodiment, the image of the implement may be obtained using the vision system 120. The image may include, for example, an image of a work area adjacent to the tractor. The image obtained by the vision system may include for example an image of one or more of an image of the boom 20, an image of the tool carrier 22 on the boom, an image of an implement attached with the tool carrier, and/or an image of a load before or after the load is engaged by or with the implement 24. In the example illustrated, the image obtained by the vision system 120 may include for example an image of the set of one or more target devices 310 carried on the loader 10, wherein the image may include an image of a set of one or more boom target devices 320 carried on the boom 20 of the loader 10, and may also include for example an image of a set of one or more tool carrier target devices 330 carried on a tool carrier 22 of the loader 10.

In the example illustrated, the vision system 120 operates to generate work area image data representative of an image of a work area adjacent to the tractor in general, wherein the work area image data includes information or data related to features that are imaged by the system 120. In this regard and at 420, the set of one or more target devices 310 carried on the loader 10 are detected in the work area image data. The vision system 120 generates target device data representative of the image of the set of one or more target devices carried on the loader. The vision system 120 is operable to image the set of one or more boom target devices 320 to generate boom target device data, and also to image the set of one or more tool carrier target devices 330 to generate tool carrier target device data.

At 430 perception sensor parameters are received, wherein the perception sensor parameters may include one or more parameters for operating the vision system 120 and may be stored in the memory device 210 and retrieved therefrom as needed or desired.

At 440 the location of the set of one or more target devices 310 carried on the loader 10 is determined in a frame of reference. As described, the vision system 120 is operable to image the set of one or more boom target devices 320 to generate boom target device data. The processor device 204 is operable to execute the positioning assist logic 211 to determine, based on the boom target device data, a height of the boom of the loader and generate, based on the determined height of the boom, current boom height data representative of the determined height of the boom of the loader. Also as described, the vision system 120 is operable to image the set of one or more tool carrier target devices 330 to generate tool carrier target device data. The processor device 204 may also be operable to execute the positioning assist logic 211 to determine, based on the tool carrier target device data, a carrier angle of the tool carrier 22, and generate, based on the determined carrier angle of the tool carrier 22, current carrier angle data representative of the determined carrier angle of the tool carrier. Also as described, the processor device 204 may also be operable to execute the position determination logic 231 to determine, based on the determined height of the boom and the determined carrier angle of the tool carrier, an overall pose or position of the loader. Also as described, the processor device 204 may also be operable to execute the position determination logic 231 to determine the overall pose or position of the loader based on determined height of the boom and the angle of an implement or a surface and/or a geometric feature of the implement when so carried on the tool carrier.

With regard to the boom and the boom target device data, the processor device 204 is operable to execute position determination logic 231 to determine the height of the boom of the loader by determining, based on the boom target device data, a location and/or orientation of the set of one or more boom target devices 320 in a frame of reference.

In accordance with an example embodiment, the processor device 204 is operable to execute the position determination logic 231 to determine the location of the set of one or more boom target devices 320 in the frame of reference by determining a 6-dimensional (6-D) pose of the set of one or more boom target devices 320 based on: i) a location of the set of one or more boom target devices in the target device data; and ii) an area of the set of one or more boom target devices 320 in the frame of reference.

In addition and with regard to the tool carrier target device data, the processor device 204 is operable to execute position determination logic 231 to determine the carrier angle of the tool carrier by determining a location and/or orientation of the set of one or more boom target devices 320 in the frame of reference based on the tool carrier target device data.

At 450 and in accordance with an example embodiment, the coordinates of the set of target devices determined in the world coordinate system are transformed according to the loader, tractor and camera position. In this regard and in accordance with an example, the processor device 204 is operable to execute the position determination logic 231 to transform the determined location of the set of one or more boom target devices 320 in the frame of reference into a location of the set of one or more boom target devices 320 in a coordinate reference framework of the associated tractor 2 and vision system 120 operatively coupled with the associated tractor. In this regard and in accordance with an example, the processor device 204 is further operable to execute the position determination logic 231 to transform the determined location of the set of one or more tool carrier target devices 330 in the frame of reference into a location of the set of one or more tool carrier target devices 320 in a coordinate reference framework of the associated tractor 2 and vision system 120 operatively coupled with the associated tractor.

At 460 and in accordance with an example embodiment, the processor device 204 is operable to execute the position determination logic 231 to determine the position of the loader with respect to the ground supporting the tractor. The processor device 204 is operable to execute the position determination logic 231 to determine the height of the boom of the loader by determining the height of the loader relative to the tractor 2 and/or relative to the ground supporting the tractor 2 as the determined height of the boom of the loader, based on the location of the set of one or more boom target devices 320 in the coordinate reference framework of the associated tractor 2. The processor device 204 is further operable to execute the position determination logic 231 to determine the angle of the tool carrier of the loader by determining the angle of the tool carrier relative to the tractor 2 and/or relative to the ground supporting the tractor 2 as the determined angle of the tool carrier of the loader, based on the location of the set of one or more tool carrier target devices 330 in the coordinate reference framework of the associated tractor 2. The processor device 204 is operable to execute the position determination logic 231 to determine the position of the loader with respect to the ground supporting the tractor as a combination of the determined height of the boom and the determined angle of the tool carrier.

At 470 and in accordance with an example embodiment, the processor device 204 is operable to execute the positioning assist logic 211 to use the determined loader height and/or tool carrier level and/or overall loader position determinations essentially as feedback signals for performing operations of the loader as may be desired such as for example providing positional information to the operator for helping the operator position the loader and/or implement. The determined loader height and/or tool carrier level and/or loader position determinations may also be used in an example embodiment as signals for controlling operations of the loader providing implement height and level detection for performing work functions with the implements including performing repeated work functions automatically, and for approaching and engaging workpieces with the implements.

Figure 5:
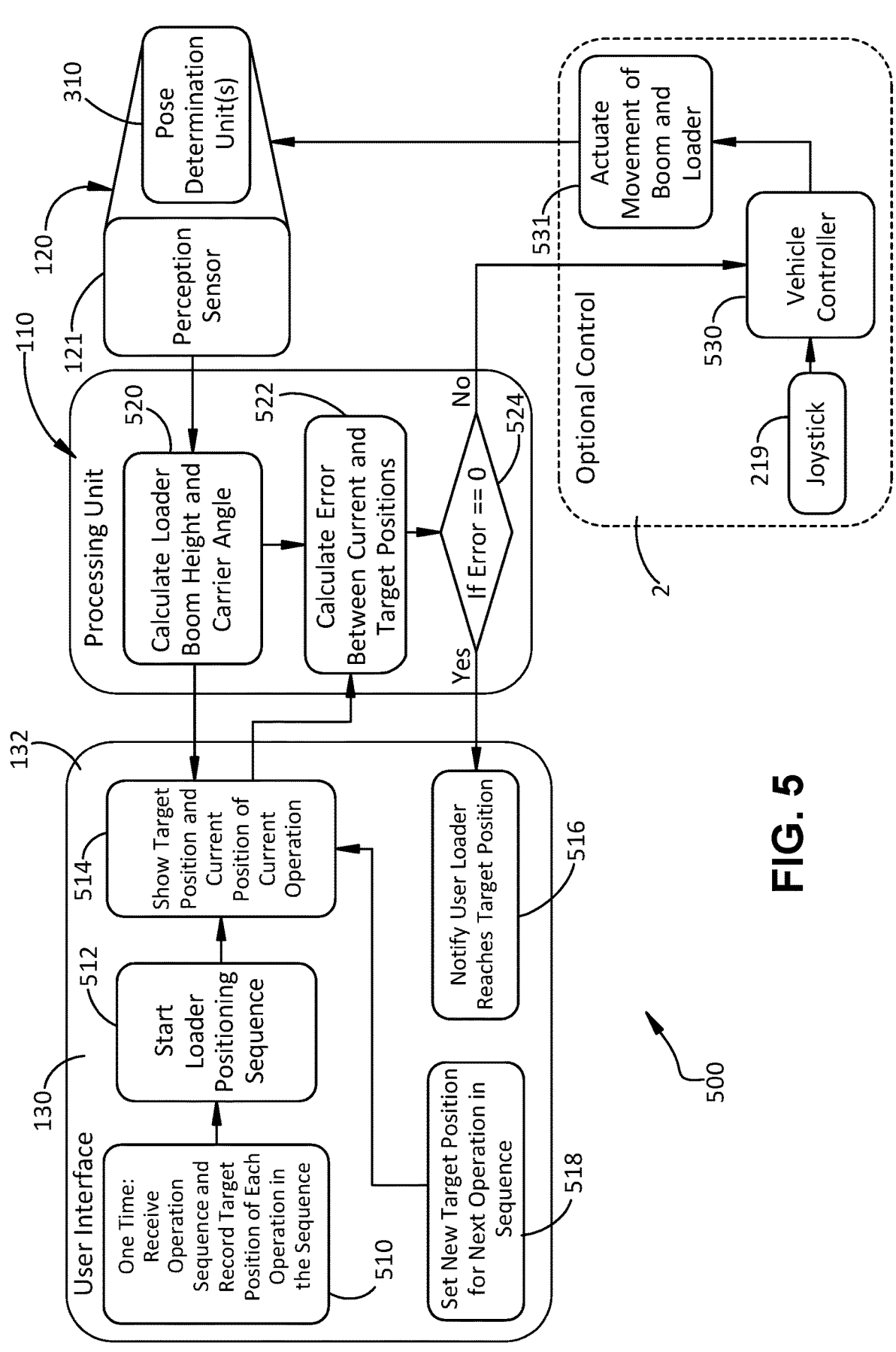
FIG. 5 is a diagram showing a functional flow of the positioning assist apparatus that obtains loader position training data and uses the obtained loader position data for performing one or more loader movement operations automatically and repeatedly in accordance with an example embodiment.

FIG. 5 is a diagram showing a functional flow 500 of the positioning assist apparatus that assists an operator perform activities with a loader of a work vehicle including loader positioning for coupling an attachment onto a tool carrier on a free end of the loader, and for providing implement height and level detection for performing work functions with the implements including performing repeated work functions automatically, and for approaching and engaging workpieces with the implements. The positioning assist apparatus may generate control signals controlling one or more cylinders 37, 39, 47, and 49 of the loader based on determined current loader height data and a desired loader position data to move the loader from the determined current height to the desired position in response to a return to position (RTP) command received by the apparatus. As shown in the functional flow 500, the positioning assist apparatus further obtains loader position training data and uses the obtained loader position data for performing one or more loader movement operations including performing the operations automatically and repeatedly as desired in accordance with an example embodiment.

In addition and following attaching the implement 24 with the tool carrier 22, the positioning assist apparatus 100 provides assistance to an operator with regard to implement height and level detection for performing work functions with the implements, including repeated work functions, and training the system for RTP operation or the like. The positioning assist apparatus 100 may function in an RTP mode to automatically return the boom 20 overall, and/or portions of the boom 20 such as for example the lift arms 36, 38 and/or the implement arms 46, 48, the various attachments, tools or implements 24 when so carried on the tool carrier 22, to one or more pre-stored position(s) in response to operator input. It is to be appreciated that all of the above operations and movements may be performed prior to attaching any of the various work implements 24 with the tool carrier 22, during/while attaching any of the various work implements 24 with the tool carrier 22, and/or after attaching any of the various work implements 24 with the tool carrier 22.

Accurately knowing the level of implement at different stages of operation with minimal operator intervention enhances productivity as well as operator comfort. Moreover, accurately knowing the level of the implement with respect to ground for specific operations (e.g. pallet loader in transport mode carrying a box) is important for productivity, efficiency and safety perspectives to avoid spillover etc. Vision based implement level indication uses a perception sensor which provides information about current loader and/or implement level and that can be compared against a reference value (e.g. ground plane) stored in a memory device or as may be provided an operator of the vehicle to generate an error signal. Knowledge of the loader and/or implement level is beneficial to operator so that suitable manual corrective action may be undertaken as may be desired or necessary. In addition, automatic control can be provided using a controller that may act upon the error signal described above to generate corrective commands to quickly and accurately attain the desired loader and/or level of the implement. This also results in an enhanced safety and work efficiency while operating the loader in automatic loader and/or implement level control mode.

The example virtual guidance apparatus or controller 100 can send messages and receive data, including program code, through the network(s), network link 220 and communication interface 218. In an Internet-connected example embodiment, the loader position control apparatus 100 is operatively connected with a plurality of external public, private, governmental or commercial servers (not shown) configured to execute a web application in accordance with example embodiments. The example loader position control apparatus 100 suitably includes several subsystems or modules to perform the virtual operator's guidance as set forth herein. A benefit of the subject apparatus is to provide improved guidance by displaying information regarding a position of the loader, to provide assistance to an operator for moving a loader carried on a tractor to desired positions, and to generate control signals controlling one or more cylinders 37, 39, 47, and 49 of the loader to move the loader to one or more desired positions in response to a return to position (RTP) command received by the apparatus. An output device 215 may also be provided such as in the form of a sound generating device such as a speaker to help improve guidance assistance by generating audible guidance instructions in the form of audible instructions and/or suitable instructional noises such as beeps, voice messages or the like that can be heard from an operator's seat of the associated work vehicle for helping the operator to be alerted to current positions of the mechanisms as well as to be audibly instructed of preferred or recommended loader and/or implement heights and/or positions or levels for movement of the loader and/or tool carrier mechanisms to safely and efficiently load, unload, or otherwise couple the desired implement 24 with the tool carrier 22, and also to handle the material using the implement 24 received onto the carrier 22.

As shown, the vision system 120 may including for example an vision sensor device 121, or other optical device(s). The vision system 120 is operable to image a set of one or more target devices 310 carried on the loader 10 to generate target device data representative of the image of the set of one or more target devices. The set of one or more target devices 310 may comprise, for example, a set of one or more boom target devices 320 carried on a boom 20 of the loader 10, and a set of one or more tool carrier target devices 330 carried on the tool carrier 22 of the loader 10. The vision system 120 is operable to image the set of one or more boom target devices 320 to generate boom target device data representative of the image of the set of one or more boom target devices 320, and to image the set of one or more tool carrier target devices 330 to generate tool carrier target device data representative of the image of the set of one or more tool carrier target devices 320.

The controller 530 of the tractor 2 may react to control signals to actuate 531 the one or more controlled devices of the tractor such as for example the cylinders 37, 39 coupled between the aft bracket set 30 and the mid bracket set 34 and/or the bucket cylinders 47, 49 coupled between the mid bracket set 34 and the forward bracket set 33 in order to move the loader and tool carrier to locate the implement in the desired level position. The control signals may be received directly or indirectly via the loader position control apparatus 110 and/or from a joystick 219 operatively coupled with the positioning assist apparatus. Actuation of the cylinders 37, 39 47, 49 results in movement of the loader 10 and/or implement carried on the tool carrier wherein movement of the boom target devices 320 and/or tool carrier target devices 330 is detected by the vision system 120, wherein the movement of the target devices 320, 330 infers movement of the loader and/or implement.

The example embodiment of the virtual guidance apparatus further includes an input device 214 operatively coupled with the positioning assist unit. The input device 214 may be used during a training of the virtual guidance apparatus for receiving a boom and tool carrier level position training signal representative of the first predetermined target location alignment of the boom and tool carrier to establish a predetermined relative physical position between the implement carried on the tool carrier portion of the loader and the ground. In an example embodiment the input device 214 may include a touchscreen portion 134 of the display unit 130, a pointer device 216 operatively coupled with the positioning assist unit, or any other device or means of communicating training and other information to the control unit 110 of the virtual guidance assist apparatus 100.

In an example embodiment during system training 510 in a configuration mode of the system such as will be explained below and described with reference to FIG. 12A, the operator may position the boom 20 and/or tool carrier 22 carrying an implement to a sequence of desired levels or positions, then select virtual level set point selection indicia that may be displayed on the touchscreen 134 using a pointer or finger while the boom, tool carrier, and implement are in a desired position to dispose the implement level relative to the ground.

Further in an example embodiment, the operator may position the tool carrier 22 in a desired position relative to the boom 20, then drag and drop the virtual indicia movable on the touchscreen 134 onto a selected portion of the image of boom on the screen 132 while the tool carrier 22 is in a desired position relative to the boom 20, wherein the virtual indicia comprises the carrier position training signal representative of a selectable target location on the screen for alignment of the carrier target device in the viewable image of the loader to establish a desired relative physical position between the carrier portion of the boom and the vehicle, the ground supporting the associated work vehicle, and/or relative to the boom 20. In an example embodiment, the virtual indicia may be a crosshair for example. In a further example embodiment, the virtual indicia may be a visual symbol such as a logo, for example. In yet a further example, the virtual indicia may be a static image capture of the tool carrier 22 disposed in the desired position relative to the boom 20.

In an example embodiment, the operator moves the loader and/or implement carried on the loader to desired positions. The optical system 120 receives an image of markers carried on the loader and/or tool carrier while the implement carried on the loader is held in the desired position relative to the ground supporting the tractor. In this position, the operator may then select a virtual level set point selection indicia that is displayed on the touchscreen 134 using a pointer or finger while the boom, tool carrier, and implement are held in the desired position to dispose the implement level relative to the ground. The image of the markers is thereby captured by the optical system 120 and stored as implement level set point data in the memory device 210 of the positioning assist apparatus 110. In addition, an image of the loader and/or implement carried on the loader is displayed on the screen 132 as a loader image.

Thereafter, the operator may move the loader and implement carried thereon using standard tractor control mechanisms, etc. When it is desired to move the implement to the level position the operator may select a level command indicia displayed on the screen 132 whereupon the processor of the positioning assist apparatus 110 may execute the position assist logic 211 to calculate a loader boom height and/or tool carrier level at 520 and deliver the image data received from the optical system 120 to the display unit 130 for display at 514 together with a display of the loader and implement set in the desired level position. The pair of loader and implement images may be displayed, for example, as mutual overlays for visualization by the tractor operator.

The processor of the positioning assist apparatus 110 may further execute the position assist logic 211 to calculate at 522 an error at 522 between the current carrier position and the desired recorded carrier position.

If it is determined at 524 that the error at 522 between the current loader boom height and/or tool carrier angle and/or implement surface and/or geometric feature and the desired loader boom height and/or tool carrier angle is minimal, the user is notified at 516 that the loader boom and/or the tool carrier are at their respective desired positions to realize the level between the implement and the ground.

If on the other hand it is determined at 524 that the error at 522 between the current loader boom height and/or tool carrier angle and the desired recorded loader boom height and/or tool carrier angle is substantial, a level control signal is generated for delivery to functional elements of the tractor 2. To that end, the loader position control apparatus 100 includes a communication interface 218 (FIG. 2) coupled with the bus 202 that provides a two-way data communication coupling to a network link 220 that is connected to local network 212 such as for example a local network of the work vehicle 1 such as a Controller Area Network (CAN) bus or the like. The communication interface 218 may be a controller area network (CAN) card to provide a data communication connection to a compatible CAN bus. As another example, communication interface 218 may be a local area network (LAN) card to provide a data communication connection to a compatible LAN of the vehicle 2.

Operationally, the user interface 130 may receive at 510 a sequence of operations from the operator of the work vehicle 1, and record the sequence during a training of the subject positioning assist apparatus 100. Once trained for movement to the one or more loader boom height and/or tool carrier angle positions, the sequence may be initiated at 512.

The movement of the loader boom and/or of the tool carrier may be displayed at 514 on the display 132 of the display unit 130.

The sequence of loader and/or tool carrier movements may be stored in the memory device 210 as training data. The training data may be stored during the training of the apparatus 100, or it may be received from a source external from the apparatus. The loader task data stored in the memory device 210 may be representative of a desired automated operation to be performed by the loader and may comprise a set of loader orientation command data representative of an ordered sequence of positions to assume by the loader to perform a desired automated operation. The processor device 204 is operable to execute automated operation logic 233 to, in turn for each loader orientation command data of the first set of loader orientation command data: determine, based on the vision system 120 imaging the target device data, a further current height of the loader; generate, based on the determined further current height of the loader, further current loader height data representative of the determined further current height of the loader; and generate the control signal controlling the one or more cylinders 37, 39, 47, and 49 of the loader 10 based on a selected loader orientation command data of the loader task data and the generated further current loader height data to move the loader 10 from the determined further current height to a desired height position of the ordered sequence of positions in response to the return to position (RTP) command received by the positioning assist apparatus for performing the desired automated operation.

In the example embodiment, the processor device 204 of the positioning assist apparatus 100 is operable to execute training logic 230 to generate the loader task data during a training session of the positioning assist apparatus 100 with the loader disposed in a first desired position of the ordered sequence of positions to assume by the loader to perform the desired automated operation by imaging by the vision system 120 the set of one or more target devices 310 carried on the loader 10 to generate first target device training data representative of the image of the set of one or more target device images obtained with the loader disposed in the first desired position, and storing the first target device training data in the memory device as the loader task data. The processor device 204 is further operable to execute the training logic 230 to generate the loader task data during the training session of the positioning assist apparatus 100 with the loader disposed in a second desired height position of the ordered sequence of positions to assume by the loader to perform the desired automated operation, by imaging by the vision system 120 the set of one or more target devices 310 carried on the loader 10 to generate second target device training data representative of the image of the set of one or more target device images obtained with the loader disposed in the second desired position, and storing the second target device training data in the memory device as the loader task data. This is the minimum 2-step training sequence in accordance with an example embodiment.

The positioning assist apparatus 100 according to an example embodiment further includes an input device 214 operatively coupled with the loader position control apparatus 110. The input device 214 is operable to receive a training confirmation signal, wherein the processor device 204 is operable to execute the training logic 230 to store the first and second target device training data in the memory device as the loader task data based on the input device 214 receiving the training confirmation signal from the operator of the associated tractor 2.

Figure 6:
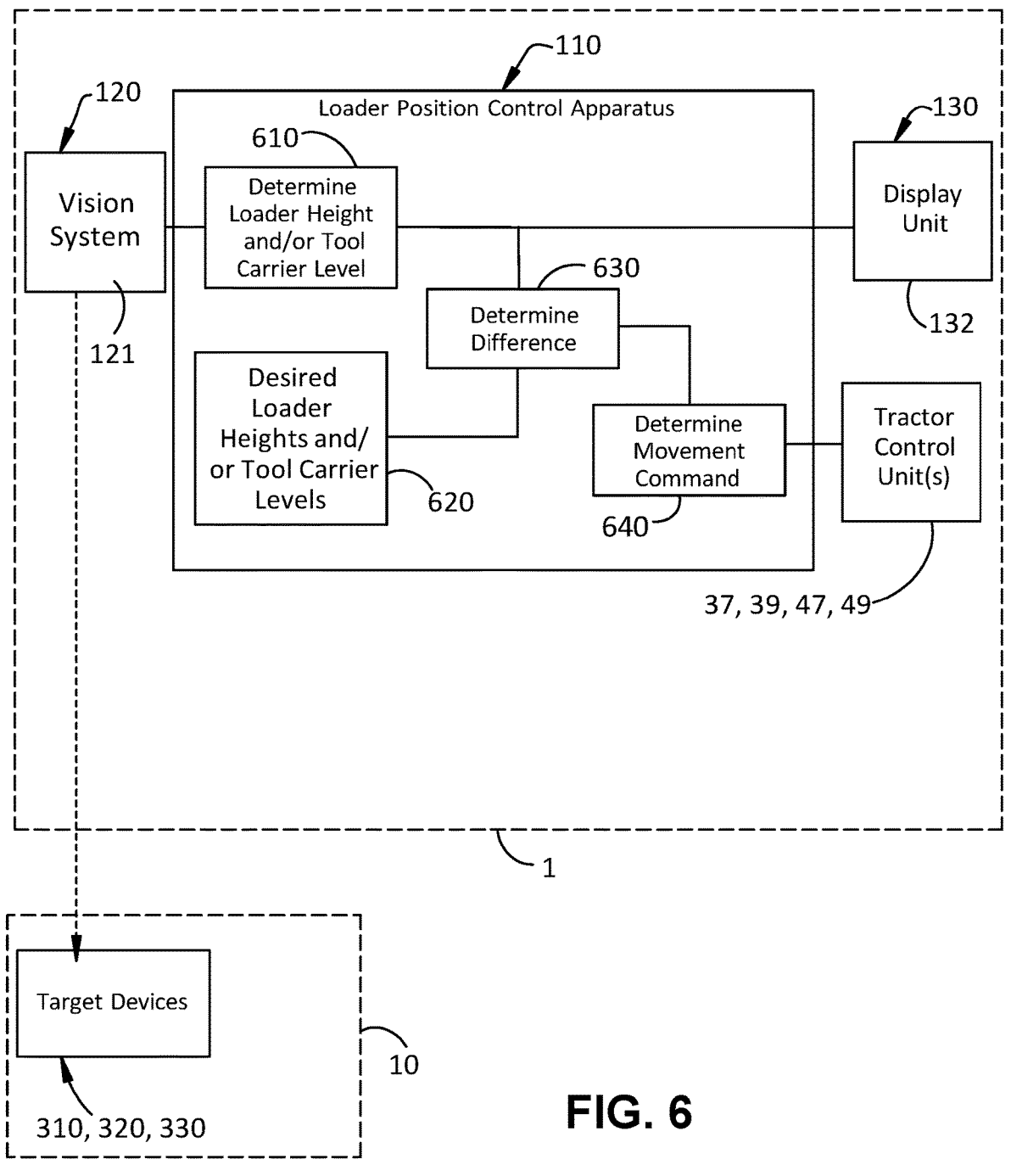
FIG. 6 is a functional block diagram showing the positioning assist apparatus in accordance with an example embodiment.

FIG. 6 is a functional block diagram showing the positioning assist apparatus in accordance with an example embodiment. As shown the apparatus 100 includes a loader position control apparatus 110, an vision system 120 in the form in the example of an vision sensor device 121, and a display unit 130 including a screen 132 that is viewable by an operator of the tractor. The vision system 120 is operable to image a set of one or more target devices 310, 320, 330 carried on the loader 10 and tool carrier 22 to generate target device data representative of the image of the set of one or more target devices.

The height of the loader is determined at 610. The determined height of the loader may be displayed on the display unit 130, for example.

A difference may be determined at 630 between the determined height of the loader and a desired height at 620 of the loader. A movement command may be determined at 640 for supplying the movement command to the control system of the tractor for exercising for example the cylinders 37, 38, 47, 48.

Figure 7:
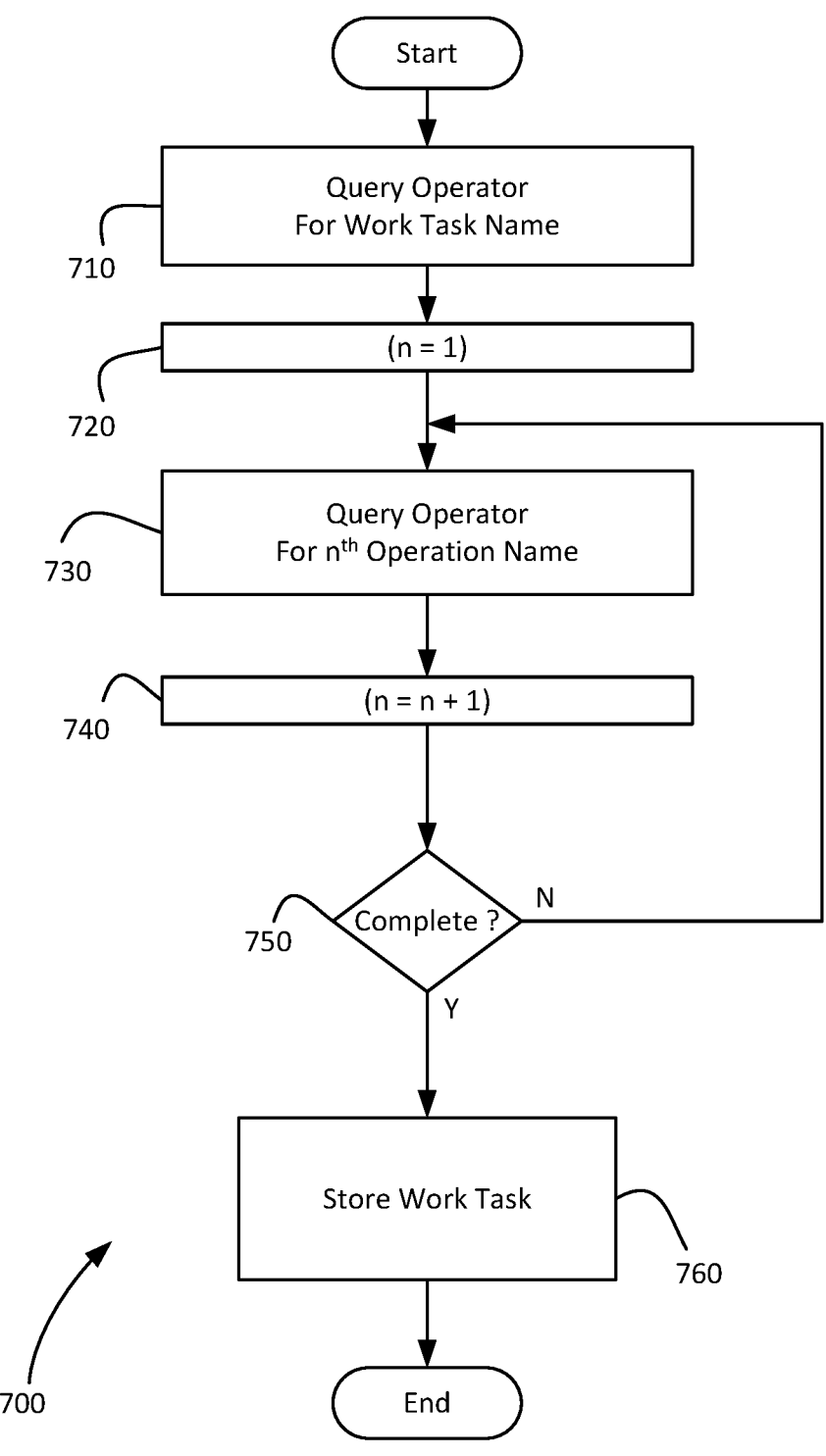
FIG. 7 is a flow diagram showing a method of an initial training phase of the positioning assist apparatus in accordance with an example embodiment.
Figure 8:
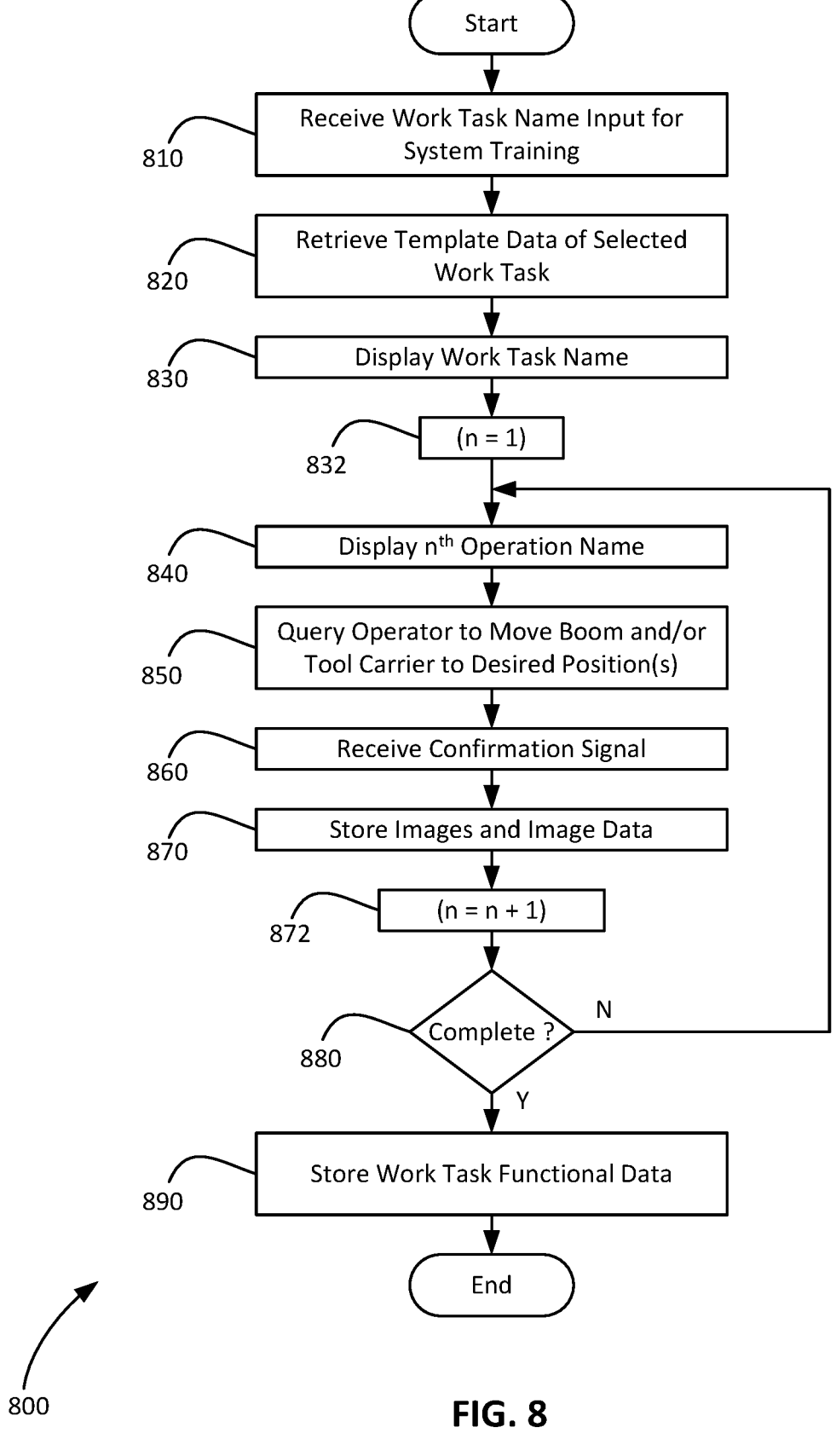
FIG. 8 is a flow diagram showing a method of a secondary training phase of the subject positioning assist apparatus in accordance with an example embodiment.

FIG. 7 is a flow diagram showing a method 700 of an initial training phase of the positioning assist apparatus 100 in accordance with an example embodiment. The initial training phase method 700 is in general a "static" training in that the loader 10 need not be moved. In the example it is used to generate template data in a setup phase of training the loader assist system. In addition and to follow, FIG. 8 is a flow diagram showing a method 800 of a of the subject positioning assist apparatus 100 in accordance with an example embodiment. The secondary training phase method 800 in general is a "dynamic" training in that the loader 10 need is moved by the operator during this training phase. In the example, it is used to generate task data for populating the template data that is generated in the initial training method 700 of FIG. 7. The task data stored in the template data are collectively used by the positioning assist apparatus 100 to perform a specific work task using the loader of the associated tractor 2.

Figure 12A:
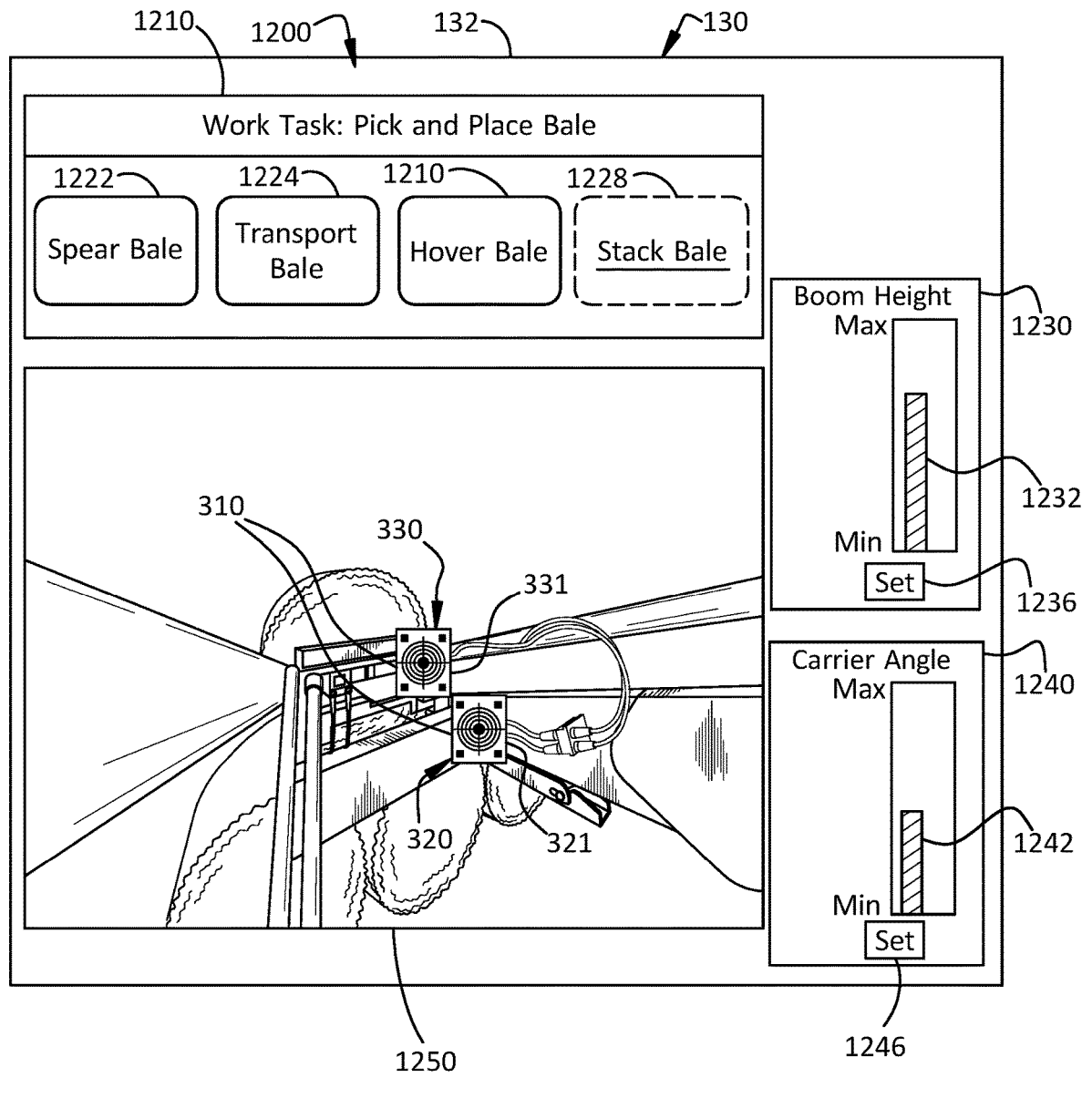
FIG. 12A shows an image that is displayed on a screen of a display unit that is viewable by an operator of the work vehicle while planning to perform work tasks in a configuration mode for training the system in accordance with an example embodiment.

With reference first to FIG. 7 and with additional reference to FIG. 12A, the initial training method 700 includes querying the operator at 710 of the tractor for a designation of a name of a work task to be performed by the loader 10. The querying may include for example presenting a virtual "Work Task Name" field on the screen 132 of the display unit 130 for receiving therein from the operator a task name that is selected and determined by the operator. As an example, the work task name concocted by the operator may be "Pick and Place Bale" wherein the underlying work task overall comprises moving a bale from a first intermediate location to a storage location. In accordance with the example embodiment, the task name may be keyed in by the operator or may be otherwise provided using the input device 214 including the touchscreen portion 134 of the display unit 130, the pointer device 216 operatively coupled with the positioning assist apparatus, the joystick 219 operatively coupled with the positioning assist apparatus or by any other device or means of communicating training and other information to the control unit 110 of the virtual guidance assist apparatus 100. Data representative of the designated work task name is stored by the positioning assist apparatus 100 in the non-transient memory device 210.

A counter n is set at 720 and thereafter the processor device 204 of the system 100 may execute the training logic 230 stored in the memory device 210 to generate the loader task data during the initial phase of the training session 700 to query the operator at 730 for a designation of a first operation (where n=1) of the designated work task name.

The querying may include for example presenting a virtual "Select First Operation Name" field on the screen 132 of the display unit 130 for receiving therein from the operator a name of the first operation of the Pick and Place Bale work task in the example that is selected and determined by the operator. As an example, the name of the first operation of the Pick and Place Bale work task concocted by the operator may be "Spear Bale" for example. This represents the first step in moving the bale from the first intermediate location to the storage location. In accordance with the example embodiment, the name of the first operation may be keyed in by the operator or may be otherwise provided using the input device 214 including the touchscreen portion 134 of the display unit 130.

Following incrementing the counter at 740 the operator is further queried at 750 by the system 100 executing the training logic 230 for any additional operations that are desired for the subject work task. If the set of operations to be performed have all been identified by the operator, the method 700 at 760 stores the data provided by the operator related to the work task in the non-transient memory device 210 of the positioning assist apparatus 100. However, if the set of operations to be performed have not all been identified by the operator, the method returns to execute the training logic 230 for additional operations that are desired for the subject work task at 730 to query once again the operator for an identification of a further name of a subsequent operation. In accordance with an example embodiment, the Pick and Place Bale work task may include for example the Spear Bale operation, a Transport Bale operation, a Hover Bale operation, and a Stack Bale operation. In this example, the counter n is incremented at 740 three (3) times for a total of a set of four (4) operations of the desired Pick and Place Bale work task.

With reference next to FIG. 8 and with additional reference to FIG. 12A, a method 800 of a secondary training of the positioning assist apparatus 100 in accordance with an example embodiment is shown. The method 800 in general is a "dynamic" training in that the loader 10 is moved during this training phase with the positioning assist apparatus 100 essentially in a configuration mode. The method 800 is useful for generating task data underlying the task name data for performing a specific task. The data generated during the secondary training 800 is used in the example to populate the template data that was generated in the initial training method 700 shown in FIG. 7.

It is to be appreciated that the memory device 210 may store data relating to many different work tasks. This being the case, the processor device 204 of the system 100 may execute the training logic 230 stored in the memory device 210 to query the operator of the associated tractor 2 at 810 for a selection of a work task name, wherein the work task name is preferably previously stored. The querying may include for example presenting a virtual "Select Work Task Name" image field on the screen 132 of the display unit 130 for receiving therein from the operator an input that selects a desired work task for training. As an example, the operator may select at 810 the "Pick and Place Bale" work task for example. In accordance with the example embodiment, the task name selection may be keyed in by the operator or may be otherwise provided using the input device 214 including the touchscreen portion 134 of the display unit 130, the pointer device 216 operatively coupled with the positioning assist apparatus, the joystick 219 operatively coupled with the positioning assist apparatus or by any other device or means of communicating training and other information to the control unit 110 of the virtual guidance assist apparatus

100. Data representative of the task template relating to the selected work task name is retrieved at 820 by the positioning assist apparatus 100 from storage in the non-transient memory device 210.

The method of the example displays at 830 an image of the selected work task name on the screen 132 of the display unit 130. In accordance with the example embodiment, the image of the selected work task name is displayed on the screen 132 juxtaposed with or otherwise adjacent to an image 1250 of the loader such as shown for example in FIG. 12A. The name of the work task may be rendered in a work task name image field 1210 (FIG. 12A) of an image 1200 presented to the operator on the display unit 130.

A counter is set at 832 and thereafter the system 100 executes the training logic 230 to display at 840 an image of the name of the first (for n=1) operation. In accordance with the example given above, the system displays the name of the work task as "Pick and Place Bale" and the name of the first operation of the Pick and Place Bale work task as "Spear Bale." In accordance with the example embodiment, the images of the selected work task as well as of the initial operation of the selected work task are displayed juxtaposed with or otherwise adjacent to the image 1250 of the loader such as shown for example in FIG. 12A. The collective image 1200 displayed on the display device 130 may include an operation subset image panel 1220, a boom height image panel 1230, and a carrier angle image panel 1240 all of which being presented to the operator juxtaposed with the loader image 1250.

The operator is queried at 850 to move the boom 20 and/or the tool carrier 22 on the free end 23 of the boom 20 to position(s) as desired by the operator for performing the first operation of the selected work task. In the example embodiment, the system queries the operator by presenting an image of a prompt on the screen 132 of the display unit 103 to move the selected components of the loader 10 to their respective desired position(s) for performing the Spear Bale operation of the Pick and Place Bale work task.

After having moved the boom 20 and/or the tool carrier 22 to their respective desired position(s), the operator may provide a confirmation signal to be received by the system 100 at 860 whereupon the system derives information based on images of the set of one or more target devices 310 carried on the loader 10 to generate target device data representative of the image of the set of one or more target devices. The confirmation signal of the loader being in the desired height may be received by the system via a boom height selection input/output image panel 1236. The boom height selection input/output image panel 1236 may comprise indicia on the touchscreen portion 134 of the display unit 130 that solicits the operator to confirm the desired position of the boom and that provides visible confirmation such as by illuminating after the operator touches the panel 1236. Similarly, the confirmation signal of the carrier being at the desired angle may be received by the system via a carrier angle selection input/output image panel 1246. The carrier angle selection input/output image panel 1246 may comprise indicia on the touchscreen portion 134 of the display unit 130 that solicits the operator to confirm the desired angle of the tool carrier and that provides visible confirmation such as by illuminating after the operator touches the panel 1246.

Following incrementing the counter at 872 the system 100 determines at 880 whether target device data representative of the image of the set of one or more target devices has been collected with the boom 20 and/or the tool carrier 22 of the loader 10 being disposed in their respective desired position (s) for the respective operation for all of the operations of the selected work task. In accordance with the example embodiment, the system is aware of the number or quantity of operations because the counter information is stored during the initial phase of the system training (FIG. 7) wherein and in accordance with the example embodiment, the system is aware that four (4) separate sets of target device data representative of the image of the set of one or more target devices need to be collected to fully train the system to perform operator assistance in accomplishing the Pick and Place Bale work task.

In accordance with the example embodiment, the system 100 collects target device data representative of the image of the set of one or more target devices for each of the Spear Bale, Transport Bale, Hover Bale, and Stack Bale operations of the example Pick and Place Bale work task. It is to be appreciated that the system is configured to collect the target device data representative of the image of the set of one or more target devices for each of the operations after the operator has first moved the boom 20 and/or the tool carrier 22 of the loader 10 to their desired positions for the relevant operation, and thereafter confirmed to the system that the boom 20 and/or the tool carrier 22 of the loader 10 were indeed at their desired positions for the relevant operation.

The full set of target device data representative of the image of the set of one or more target devices for each of the Spear Bale, Transport Bale, Hover Bale, and Stack Bale operations of the example Pick and Place Bale work task is stored as training data in the memory device 210 at 890.

Overall and as described above, training logic 230 is stored in the memory device 210. The training logic 230 is executable by the processor device 204 to generate the loader task data during a training session 700, 800 of the positioning assist apparatus 100. The training data is generated by first disposing the loader in a first desired height of the ordered sequence of loader heights to assume by the loader to perform the desired operation, whereupon the vision system 120 images the set of one or more target devices 310 carried on the loader 10 to generate first target device training data representative of the image of the set of one or more target device images obtained with the loader disposed in the first desired height.

Also with the loader disposed in the first desired height of the ordered sequence of loader heights to assume by the loader to perform the desired operation and based on receiving a first training confirmation signal from the operator of the associated tractor 2 via the input device 214 operatively coupled with the loader position control apparatus 110, the first target device training data is stored in the memory device 210 as a first of the set of loader height command data of the loader task data.

Similarly, second target device training data is obtained during the training session 700, 800 of the positioning assist apparatus 100. The second target device training data is generated by disposing the loader in a second desired height of the ordered sequence of loader heights to assume by the loader to perform the desired operation, whereupon the vision system 120 images the set of one or more target devices 310 carried on the loader 10 to generate the second target device training data representative of the image of the set of one or more target device images obtained with the loader disposed in the second desired height.

Also with the loader disposed in the second desired height of the ordered sequence of loader heights to assume by the loader to perform the desired operation and based on receiving a second training confirmation signal from the operator of the associated tractor 2 via the input device 214 operatively coupled with the loader position control apparatus 110, the second target device training data is stored in the memory device 210 as a second of the set of loader height command data of the loader task data.

Overall and similarly, $n^{th}$ target device training data is obtained during the training session 700, 800 of the positioning assist apparatus 100. The $n^{th}$ target device training data is generated by disposing the loader in an $n^{th}$ desired height of the ordered sequence of loader heights to assume by the loader to perform the desired operation, whereupon the vision system 120 images the set of one or more target devices 310 carried on the loader 10 to generate the $n^{th}$ target device training data representative of the image of the set of one or more target device images obtained with the loader disposed in the $n^{th}$ desired height.

Also with the loader disposed in the $n^{th}$ desired height of the ordered sequence of loader heights to assume by the loader to perform the desired operation and based on receiving an $n^{th}$ training confirmation signal from the operator of the associated tractor 2 via the input device 214 operatively coupled with the loader position control apparatus 110, the $n^{th}$ target device training data is stored in the memory device 210 as an $n^{th}$ of the set of loader height command data of the loader task data.

Figure 9:
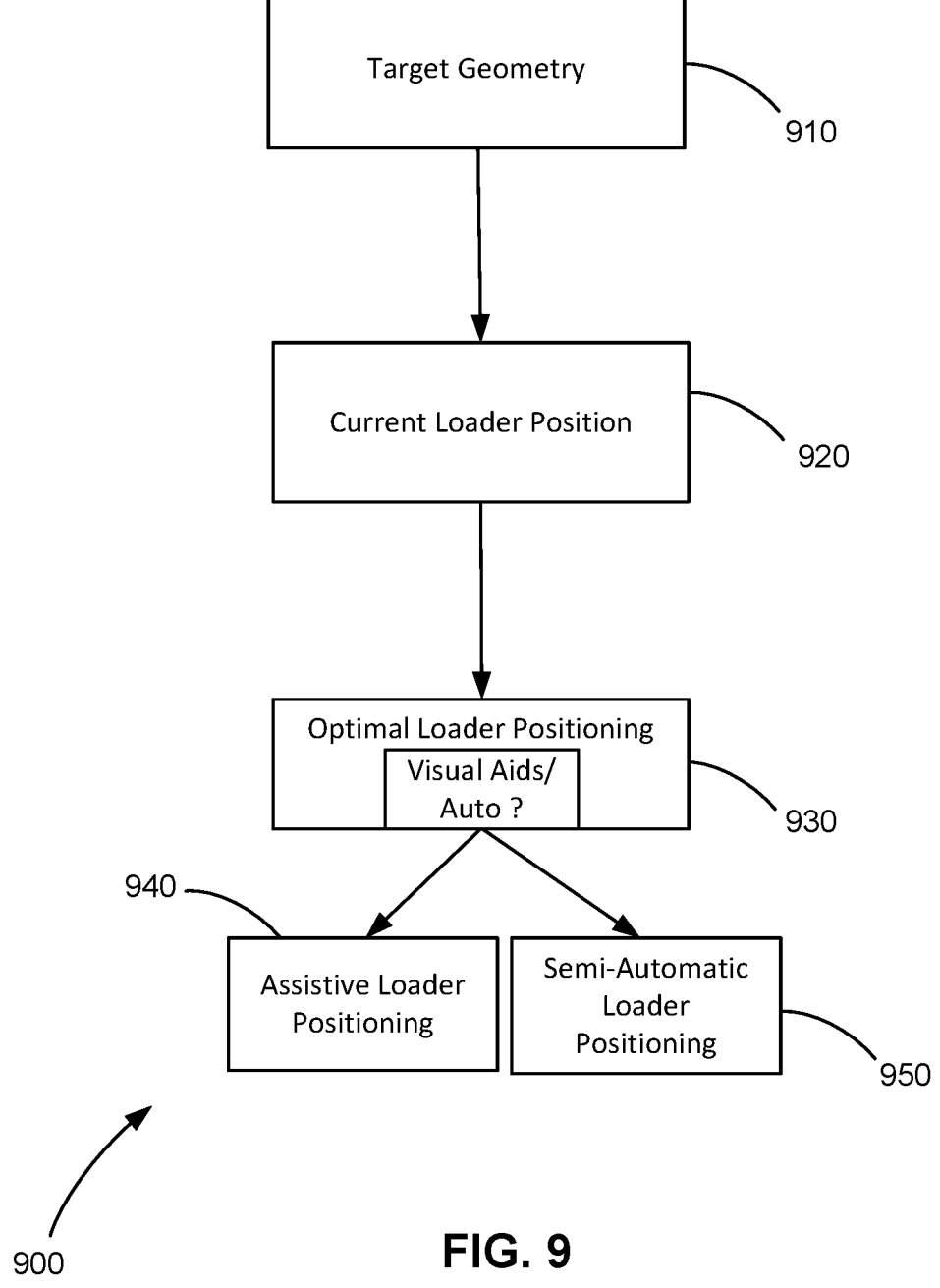
FIG. 9 is a flow diagram showing a position assist selecting method 900 in accordance with an example embodiment.

FIG. 9 is a flow diagram showing a position assist selecting method 900 in accordance with an example embodiment. In general, the system 100 may be exercised in an operator assist mode using visual cues regarding current and desired boom and/or tool carrier position(s), and in a semi-automated operator assist mode for assisting the operator by automatically moving the boom and/or tool carrier to desired position(s) of a sequence of operations of a work task.

The method includes at 910 imaging by a vision system of a position assist apparatus a target such as a workpiece such as for example a bale to determine a geometry of the bale.

The method further includes at 920, determining a current position of the loader, and determining at 930 an optimal position of the loader for lifting the bale using an implement such as for example the bale spear implement 25.

The method includes at 940, executing operator assistive operation logic stored in the memory device of the positioning assist apparatus to generate signals for determining the boom height and/or tool carrier angle for determining the loader height in accordance with the example embodiments. The boom height and/or tool carrier angle may be determined by the system imaging the set of one or more target devices 310 including the set of one or more boom target devices 320 carried on a boom 20 of the loader 10, and the set of one or more tool carrier target devices 330 carried on the tool carrier 22 of the loader 10. Images may be presented to the operator such shown in FIG. 12B for example for informing the operator of the current height of the boom, the current angle of the tool carrier, a desired boom height for completion of a current operation of a selected work task, and a desired angle of the tool carrier for the completion of the current operation of a selected work task.

The method further includes at 950, executing automated operation logic stored in the memory device of the positioning assist apparatus to generate control signals controlling one or more cylinders 37, 39, 47, and 49 of the loader based on the current loader height data and the desired loader position data to move the loader from the determined current height to the desired position in response to a return to position (RTP) command received by the positioning assist apparatus to perform assistive loader positioning for lifting the bale using an implement such as for example the bale spear implement 25. The RTP command may be received by the positioning system by the operator conforming that the loader may be moved. The confirmation from the operator may be received by the operator using a movement confirmation image panel 1262 (FIG. 12B) of a confirmation input-output panel 1260 that may comprise indicia on the touchscreen portion 134 of the display unit 130 that solicits the operator to confirm by using a loader movement selection input/output image panel 1262 that the loader may be moved from a current position to the next position in the sequence of operations of the selected work task.

Figure 10:
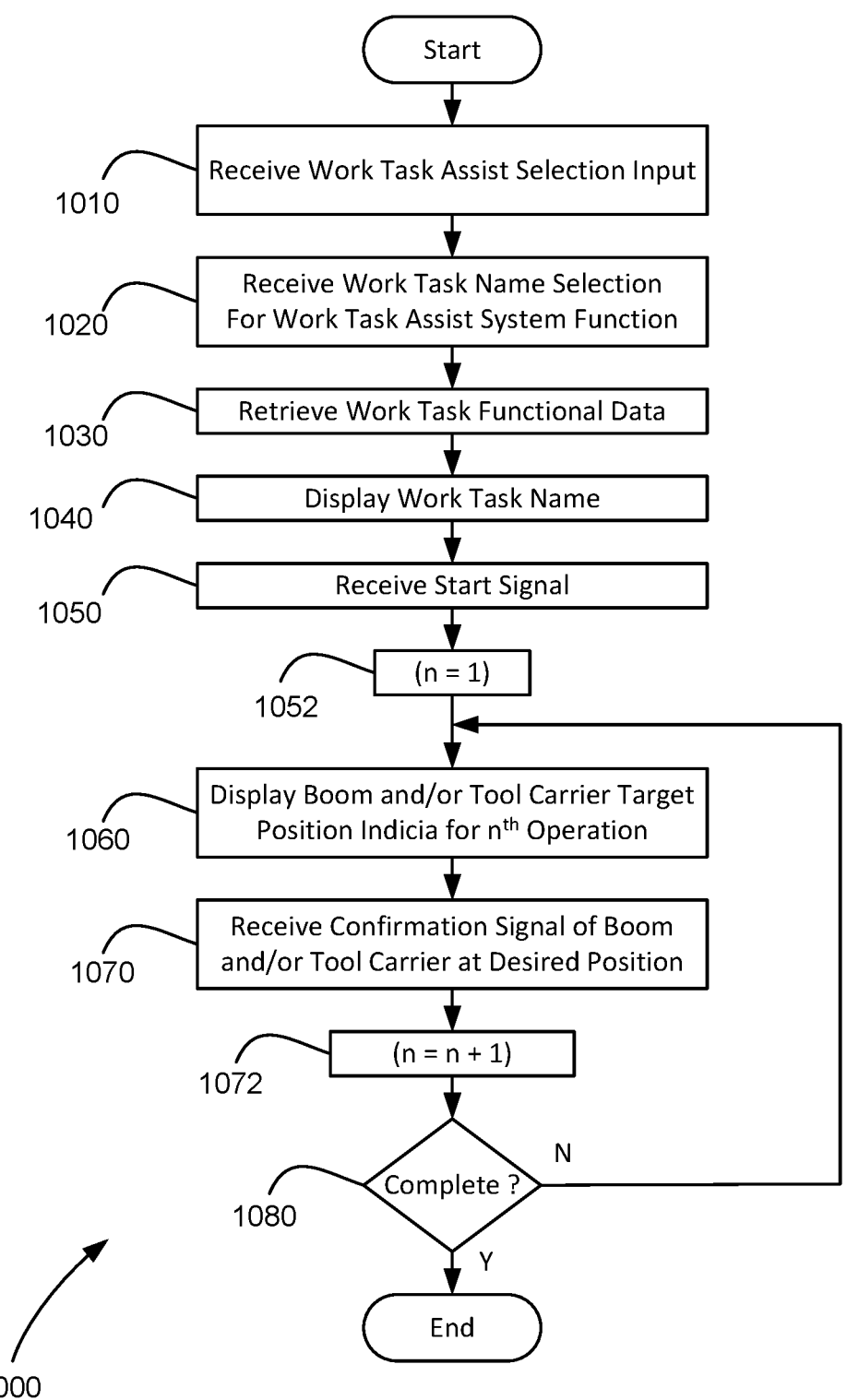
FIG. 10 is a flow diagram showing a method for visually assisting an operator move a loader to a desired height in accordance with an example embodiment.
Figure 12B:
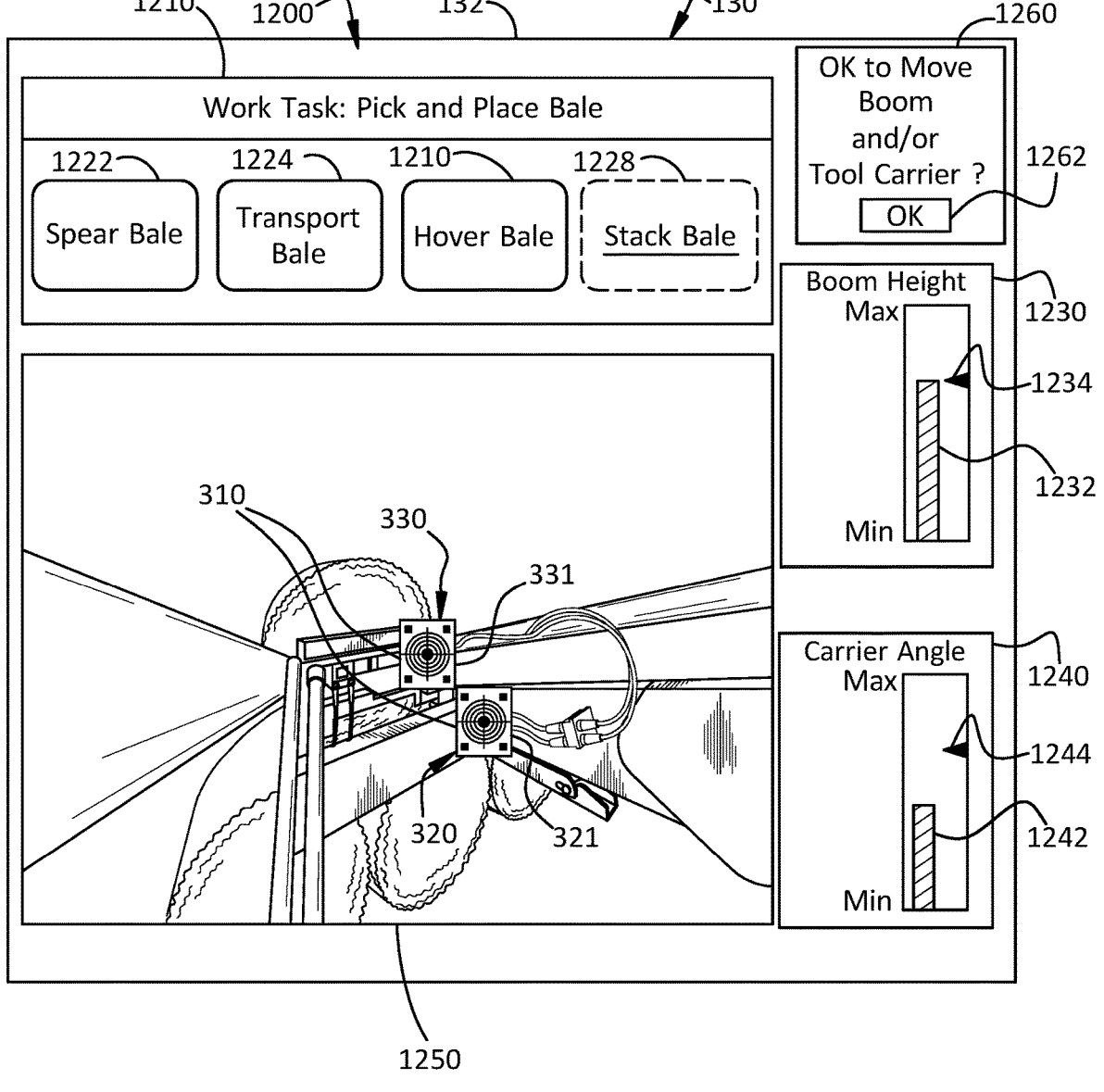
FIG. 12B shows an image that is displayed on a screen of a display unit that is viewable by an operator of the work vehicle while performing work tasks in an operation mode of the system in accordance with an example embodiment.

With reference next to FIG. 10 and with additional reference to FIG. 12B, an operator positioning assist method 1000 in accordance with an example embodiment is shown. The method 1000 in general assists the operator in moving the loader 10 to a sequence of desired loader heights with the positioning assist apparatus 100 in an operation mode. The vision system 120 images a set of one or more target devices 310 carried on the loader 10, and generates target device data that is representative of the image of the set of one or more target devices. The loader positioning logic 211 is executed by the processor device 204 to determine, based on the target device data, a current loader height of the loader, and to generate, based on the determined current loader height, current loader height data representative of the determined current loader height. The current loader height image is displayed on the screen 132 that is viewable by the operator, wherein the current loader height image visually communicates the determined current loader height to the operator for assisting moving the loader to the desired loader height.

At 1010 the system receives a selection of the visual assist functionality and, the name of a previously stored work function is received by the system from the operator at 1020 whereupon the system retrieves the appropriate work task functional data at 1030 that was previously stored during the system training 700, 800.

The work task selected by the operator is displayed at 1040 such as for example in the work task image field 1210 (FIG. 12B). The system may receive a start signal from the operator at 1050 whereupon the system operates to perform the operator visual assist functionality in accordance with eh example embodiment.

In general, the system stores desired loader height data representative of the desired loader height in the memory device 210.

The assistive operation logic 232 is executed by the processor device 204 to determine, based on the desired loader height data and the current loader height data, a difference between the desired loader height and the determined current loader height, and to generate, based on the determined difference between the desired loader height and the determined current loader height, loader movement command data representative of an incremental movement instruction required for effecting movement of the loader from the determined current loader height to the desired loader height.

A loader movement instruction image viewable by the operator is displayed on the screen 132 of the display unit 130 based on the generated loader movement command data for visually communicating to the operator the determined difference between the desired loader height and the determined current loader height for assisting moving the loader to the desired loader height. In this regard, a counter n is set at 1052, and boom and/or tool carrier target position indicia for a first operation of the selected work task is displayed at 1060. The target indicia may comprise for example indicia set out in the boom height image pale 1230 (FIG. 12B) and/or the carrier height image panel 1240.

In the example embodiment, the operator moves the boom and/or the tool carrier in a manner that the image of the current boom height indicia image 1232 matches the desired boom height indicia image 1234. In addition, the operator moves the carrier so that the current carrier angle indicia image 1242 matches the desired carrier angle indicia image 1244.

At 1072 the system receives a confirmation that the operator has moved the boom and/or the tool carrier to their desired position.

The counter is incremented at 1072 and a test is performed at 1080 to determine whether all of the operations of the selected work task have been executed. The logic executed by the processor performs anew the steps of displaying the target information at 1060 and awaits the confirmation from the operator at 1070 for each of the operations in turn. In the example embodiment, the system executes the logic to repeat steps 1060 and 1070 for each of the Spear Bale, Transport Bale, Hover Bale, and Stack Bale operations of the Pick and Place Bale work task.

In accordance with the example embodiment disclosed herein, loader task data is stored in the memory device 210, wherein the loader task data is representative of a desired operation to be performed by the loader and comprising a first set of loader height command data representative of an ordered sequence of loader heights to assume by the loader to perform the desired operation.

The assistive operation logic 232 is executed by the processor device 204 to, in turn for each loader height command data of the first set of loader height command data retrieve a further desired loader height data representative of a further desired loader height, determine, based on the vision system 120 imaging the target device data, a further current loader height of the loader, generate, based on the determined further current loader height, further current loader height data representative of the determined further current loader height, determine, based on the further desired loader height data and the further current loader height data, a further difference between the further desired loader height and the determined further current loader height, and generate, based on the determined difference between the further desired loader height and the determined further current loader height, further loader movement command data representative of a further incremental movement instruction required for effecting movement of the loader from the determined further current loader height to the further desired loader height.

A further loader movement instruction image viewable by the operator is displayed on the screen 132 of the display unit 130 based on the generated further loader movement command data for visually communicating to the operator the determined difference between the further desired loader height and the determined further current loader height for assisting moving the loader to the further desired loader height.

Figure 11:
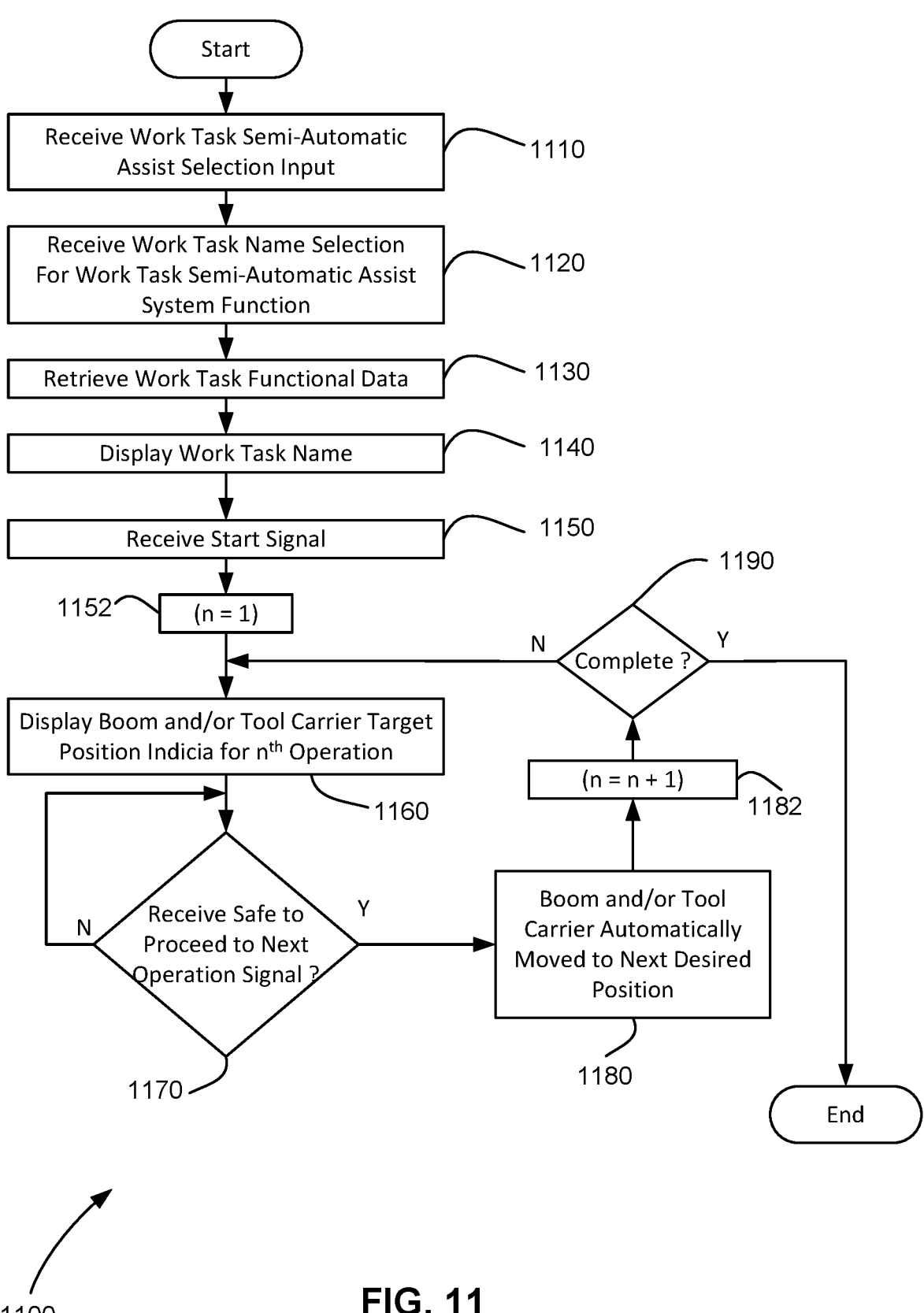
FIG. 11 is a flow diagram showing a method for visually and semi-automatically assisting an operator move a loader to a desired height in accordance with an example embodiment.

With reference next to FIG. 11 and with additional reference to FIG. 12B, an operator semi-automatic positioning assist method 1100 in accordance with an example embodiment is shown. The method 1100 in general assists the operator in moving the loader 10 to a sequence of desired loader heights. The vision system 120 images a set of one or more target devices 310 carried on the loader 10, and generates target device data that is representative of the image of the set of one or more target devices. The loader positioning logic 211 is executed by the processor device 204 to determine, based on the target device data, a current loader height of the loader, and to generate, based on the determined current loader height, current loader height data representative of the determined current loader height. The current loader height image is displayed on the screen 132 that is viewable by the operator, wherein the current loader height image visually communicates the determined current loader height to the operator for assisting moving the loader to the desired loader height.

At 1110 the system receives a selection of the semi-automatic assist functionality and, the name of a previously stored work function is received by the system from the operator at 1120 whereupon the system retrieves the appropriate work task functional data at 1130 that was previously stored during the system training 700, 800.

The work task selected by the operator is displayed at 1140 such as for example in the work task image field 1210 (FIG. 12B). The system may receive a start signal from the operator at 1150 whereupon the system operates to perform the operator visual assist functionality in accordance with eh example embodiment.

In general, the system stores desired loader height data representative of the desired loader height in the memory device 210.

The assistive operation logic 232 is executed by the processor device 204 to determine, based on the desired loader height data and the current loader height data, a difference between the desired loader height and the determined current loader height, and to generate, based on the determined difference between the desired loader height and the determined current loader height, loader movement command data representative of an incremental movement instruction required for effecting movement of the loader from the determined current loader height to the desired loader height.

A loader movement instruction image viewable by the operator is displayed on the screen 132 of the display unit 130 based on the generated loader movement command data for visually communicating to the operator the determined difference between the desired loader height and the determined current loader height for assisting moving the loader to the desired loader height. In this regard, a counter n is set at 1152, and boom and/or tool carrier target position indicia for a first operation of the selected work task is displayed at 1160. The target indicia may comprise for example indicia set out in the boom height image panel 1230 (FIG. 12B) and/or the carrier height image panel 1240.

In the example embodiment, the system 100 automatically moves, after receiving a safe to proceed signal at 1170 from the operator, the boom and/or the tool carrier in a manner that the image of the current boom height indicia image 1232 matches the desired boom height indicia image 1234. In addition, the system at 1180 moves the carrier so that the current carrier angle indicia image 1242 matches the desired carrier angle indicia image 1244, and the system further moves the carrier so that the current carrier angle indicia image 1242 matches the desired carrier angle indicia image 1244.

The counter is incremented at 1182 and a test is performed at 1190 to determine whether all of the operations of the selected work task have been executed. The logic executed by the processor performs anew the steps of displaying target information at 1160 and awaits the confirmation from the operator at 1190 for each of the operations in turn. In the example embodiment, the system executes the logic to repeat steps 11160, 1170, 1180, and 1190 for each of the Spear Bale, Transport Bale, Hover Bale, and Stack Bale operations of the Pick and Place Bale work task.

In general and in accordance with the example embodiment, automated operation logic 233 and desired loader height data representative of the desired loader height are stored in the memory device 210.

The automated operation logic 232 is executed by the processor device 204 to determine, based on the desired loader height data and the current loader height data, a difference between the desired loader height and the determined current loader height, and to generate, based on the determined difference between the desired loader height and the determined current loader position, a loader movement control signal representative of an incremental movement instruction required for effecting movement of the loader from the determined current loader height to the desired loader height.

The loader movement control signal is delivered to a controller of the associated tractor 2 to control one or more cylinders 37, 39, 47, and 49 of the loader 10 to automatically move the loader 10 from the determined current loader height to the desired loader height in response to the controller receiving the loader movement control signal.

In addition, loader task data is stored in the memory device 210. The loader task data is representative of a desired operation to be performed by the loader and comprising a first set of loader height command data representative of an ordered sequence of loader heights to assume by the loader to perform the desired operation.

The automated operation logic 232 is executed by the processor device 204 to, in turn for each loader height command data of the first set of loader height command data retrieve a further desired loader height data representative of a further desired loader height, determine, based on the vision system 120 imaging the target device data, a further current loader height of the loader, generate, based on the determined further current loader height, further current loader height data representative of the determined further current loader height, determine, based on the further desired loader height data and the further current loader height data, a further difference between the further desired loader height and the determined further current loader height, and generate, based on the determined difference between the further desired loader height and the determined further current loader height, a further loader movement control signal representative of a further incremental movement instruction required for effecting movement of the loader from the determined further current loader height to the further desired loader height.

The further loader movement control signal is delivered to the controller of the associated tractor 2 to control the one or more cylinders 37, 39, 47, and 49 of the loader 10 to automatically move the loader 10 from the determined further current loader height to the further desired loader height in response to the controller receiving the further loader movement control signal.

FIG. 12A shows an image that is displayed on a screen of a display unit that is viewable by an operator of the work vehicle while planning to perform work tasks in a configuration mode for training the system in accordance with an example embodiment. And as described above. During the training phase with the system in a configuration mode, the operator is queried to move the boom 20 and/or the tool carrier 22 on the free end 23 of the boom 20 to position(s) as desired by the operator for performing the first operation of the selected work task. In the example embodiment, the system queries the operator by presenting an image of a prompt on the screen 132 of the display unit 103 to move the selected components of the loader 10 to their respective desired position(s) for performing the Spear Bale operation of the Pick and Place Bale work task. In the example embodiment, the operator moves the boom and/or the tool carrier in a manner as desired wherein a current boom height indicia image 1232 is displayed as a representation of the actual physical current boom height. In addition, the operator moves the carrier in a manner as desired wherein a current carrier angle indicia image 1242 is displayed as a representation of the actual physical current carrier angle.

After having moved the boom 20 and/or the tool carrier 22 to their respective desired position(s), the operator may provide a confirmation signal to be received by the system 100 whereupon the system stores images of the set of one or more target devices 310 carried on the loader 10 to generate target device data representative of the image of the set of one or more target devices. The confirmation signal of the loader being in the desired height may be received by the system via a boom height selection input/output image panel 1236. The boom height selection input/output image panel 1236 may comprise indicia on the touchscreen portion 134 of the display unit 130 that solicits the operator to confirm the desired position of the boom and that provides visible confirmation such as by illuminating after the operator touches the panel 1236. Similarly, the confirmation signal of the carrier being at the desired angle may be received by the system via a carrier angle selection input/output image panel 1246. The carrier angle selection input/output image panel 1246 may comprise indicia on the touchscreen portion 134 of the display unit 130 that solicits the operator to confirm the desired angle of the tool carrier and that provides visible confirmation such as by illuminating after the operator touches the panel 1246.

FIG. 12B shows an image 1200 that is displayed on the screen 132 of the display unit 130 that is viewable to the operator of the work vehicle while performing work tasks in an operation mode of the system in accordance with an example embodiment. As described above, the loader position control apparatus 110 includes a processor device 204 (FIG. 2) and a non-transient memory device 210 (FIG. 2) operatively coupled with the processor device 204 in a manner to be described in greater detail below. The memory device 210 stores loader positioning assist logic 211 (FIG. 2) executable by the processor device 204 to assist an operator position a loader to one or more desired heights or poses for performing various work tasks. The positioning assist logic 211 is further executable by the processor device 204 to generate various images that are helpful in assisting the operator perform the work tasks. In general an in accordance with the example embodiment, the display unit 130 is operable to display on the screen 132 thereof, a work task name image field 1210, a work task operation subset image panel 1220, a boom height image panel 1230, a carrier angle image panel 1240, a loader image panel 1250, and a confirmation input-output panel 1260. As described above, the display unit 130 can be positioned in the cab 5 or elsewhere in or on the work vehicle 1 or anywhere so as to be viewable by the operator while the operator manipulates the work vehicle's controls to perform a task.

In general, the system 100 is operable to display the current selected work task in the work task name image field 1210 for viewing by the operator. As shown in the Figure, the example work task selected by the operator is the "Pick and Place Bale" work task described above.

The system is further operable to display the set of one or more operations of the selected work task in the work task operation subset image panel 1220. In accordance with the example embodiment and as describe above, the selected work task includes "Spear Bale," "Transport Bale," "Hover Bale," and "Stack Bale" operations. The system 100 operates to display the named indicia of each of the operations in image panels including a first operation image panel 1222 displaying the Spear Bale operation name, a second operation image panel 1224 displaying the Transport Bale operation name, a third operation image panel 1210 displaying the Hover Bale operation name, and a fourth operation image panel 1228 displaying the Stack Bale operation name. The fourth operation image panel 1228 displaying the Stack Bale operation is highlighted by the system and as shown in the Figure showing that the Pick and Place Bale work task has proceeded to and is currently operating in the fourth/Stack Bale operation of the selected work task.

The display unit 130 is operable to further display on a screen 132 thereof, based on the current loader height data, a loader current height image viewable by the operator of the associated tractor 2 for assisting the operator move the loader to the desired one or more position(s)/pose(s). In the example, the loader current height image includes a boom height image panel 1230 and a carrier angle image panel 1240. In the example illustrated, the boom height image panel 1230 includes a current boom height indicia image 1232 that is representative of a current height of the boom as determined by the processor device executing the position determination logic 231 to determine the height of the boom of the loader based in accordance with the target device data generated by the vision system 120 imaging the set of one or more target devices 320 carried on or otherwise provided on the boom 20 of the loader 20. It is to be appreciated that the current boom height indicia image 1232 grows and shrinks vertically as viewed in FIG. 12 as the boom is raised and lowered, respectively, thereby visually informing the operator of the current height of the boom.

The boom height image panel 1230 further includes a desired boom height indicia image 1234 that is representative of a desired height of the boom as determined by the training logic 230 executed by the system 100. It is to be appreciated that the desired boom height indicia image 1234 is located at different vertical locations as viewed in FIG. 12 based on the desired boom height of the corresponding work task operation. In the example shown, the desired boom height indicia image 1234 is set to be the desired boom height for performing the Stack Bale operation. As shown in the example, the boom needs to be raised slightly in order for the current boom height indicia image 1232 to match the desired boom height indicia image 1234 thereby confirming to the operator that he is to move the boom upwardly slightly to position the boom at the correct desired height for performing the highlighted operation; namely, the Stack Bale operation.

In the example illustrated, the tool carrier angle image panel 1240 includes a current carrier angle indicia image 1242 that is representative of a current angle of the tool carrier as determined by the processor device executing the loader position determination logic 231 to determine the angle of the carrier of the loader based in accordance with the target device data generated by the vision system 120 imaging the set of one or more target devices 330 carried on or otherwise provided on the tool carrier 22 of the loader 20. It is to be appreciated that the current carrier angle indicia image 1242 grows and shrinks vertically as viewed in FIG. 12 as the angle of the tool carrier is increased and decreased relative to the vision system 120 and thereby also relative to the boom, respectively, thereby visually informing the operator of the current angle of the tool carrier.

The tool carrier angle image panel 1240 further includes a desired tool carrier angle indicia image 1244 that is representative of a desired angle of the tool carrier as determined by the training logic 230 executed by the system 100. It is to be appreciated that the desired tool carrier angle indicia image 1244 is located at different vertical locations as viewed in FIG. 12 based on the desired tool carrier angle of the corresponding work task operation. In the example shown, the desired tool carrier angle indicia image 1244 is set to be the desired tool carrier angle for performing the Stack Bale operation. As shown in the example, the tool carrier angle needs to be increased slightly in order for the current tool carrier angle indicia image 1242 to match the desired tool carrier indicia image 1244 thereby confirming to the operator that he is to move the tool carrier forward (tilt down) slightly to position the tool carrier at the correct desired angle for performing the highlighted operation; namely, the Stack Bale operation.

The display unit 130 is operable to further display on a screen 132 thereof, an image 1250 of the loader, based on the images obtained from the vision system 120 imaging the loader 10. The loader image 1250 is conveniently presented in the image 1200 juxtaposed with or otherwise adjacent to the work task name image field 1210, the work task operation subset image panel 1220, the boom height image panel 1230, the carrier angle image panel 1240, and the confirmation input-output panel 1260.

The display unit 130 is operable to further display on a screen 132 thereof, a movement confirmation image panel 1260. The movement confirmation image panel 1260 may comprise indicia 1262 on the touchscreen portion 134 of the display unit 130 that solicits the operator to confirm by using the loader movement selection input/output image panel 1260 that the loader may be moved from a current position to the next position in the sequence of operations of the selected work task.

It is to be understood that other embodiments will be utilized and structural and functional changes will be made without departing from the scope of the claims. The foregoing descriptions of embodiments have been presented for the purposes of illustration and description. It is not intended to be exhaustive or to limit the embodiments to the precise forms disclosed. Accordingly, many modifications and variations are possible in light of the above teachings. It is therefore intended that the scope of the claims not be limited by this detailed description.

The invention claimed is:

1. A positioning assist apparatus for assisting moving a loader carried on an associated tractor to a desired loader height, the apparatus comprising: a vision system disposed on the associated tractor, the vision system being operable to image a plurality of target devices carried on the loader to generate target device data representative of an image of the plurality of target devices; a loader position control apparatus operatively coupled with the vision system, the loader position control apparatus comprising: a processor device; a non-transient memory device operatively coupled with the processor device and storing the target device data; and loader positioning logic stored in the non-transient memory device; and a display unit operatively coupled with the loader position control apparatus and comprising a screen that is viewable by an operator of the associated tractor, wherein the processor device is operable to execute the loader positioning logic to: determine, based on the target device data, a current loader height of the loader comprising a height of a boom of the loader and a carrier angle of a tool carrier of the loader; and generate, based on the determined current loader height, current loader height data representative of the determined current loader height, wherein the display unit is operable to display on the screen, based on the generated current loader height data, a current loader height image viewable by the operator of the associated tractor, the current loader height image visually communicating the determined current loader height to the operator for assisting moving the loader to the desired loader height.

2. The positioning assist apparatus according to claim 1, wherein:
the non-transient memory device stores desired loader height data representative of the desired loader height;
the non-transient memory device stores assistive operation logic; and
the processor device is operable to execute the assistive operation logic to:
determine, based on the desired loader height data and the current loader height data, a difference between the desired loader height and the determined current loader height; and
generate, based on the determined difference between the desired loader height and the determined current loader height, loader movement command data representative of an incremental movement instruction required for effecting movement of the loader from the determined current loader height to the desired loader height,
wherein the display unit is operable to display on the screen, based on the generated loader movement command data, a loader movement instruction image viewable by the operator of the associated tractor for visually communicating to the operator the determined difference between the desired loader height and the determined current loader height for assisting moving the loader to the desired loader height.

3. The positioning assist apparatus according to claim 2, further comprising: loader task data stored in the non-transient memory device, the loader task data being representative of a desired operation to be performed by the loader and comprising a first set of loader height command data representative of an ordered sequence of loader heights to assume by the loader to perform the desired operation, wherein the processor device is operable to execute the assistive operation logic to, in turn for each loader height command data of the first set of loader height command data: retrieve a further desired loader height data representative of a further desired loader height; determine, based on the vision system imaging the plurality of target devices, a further current loader height of the loader; generate, based on the determined further current loader height, further current loader height data representative of the determined further current loader height; determine, based on the further desired loader height data and the further current loader height data, a further difference between the further desired loader height and the determined further current loader height; and generate, based on the determined difference between the further desired loader height and the determined further current loader height, further loader movement command data representative of a further incremental movement instruction required for effecting movement of the loader from the determined further current loader height to the further desired loader height, wherein the display unit is operable to display on the screen, based on the generated further loader movement command data, a further loader movement instruction image viewable by the operator of the associated tractor for visually communicating to the operator the determined difference between the further desired loader height and the determined further current loader height for assisting moving the loader to the further desired loader height.

4. The positioning assist apparatus according to claim 3, further comprising: training logic stored in the non-transient memory device; and an operator input device operatively coupled with the loader position control apparatus, the operator input device being operable to receive a training confirmation signals, wherein, the processor device is operable to execute the training logic to generate the loader task data during a training session of the positioning assist apparatus by: with the loader disposed in a first desired height of the ordered sequence of loader heights to assume by the loader to perform the desired operation: imaging by the vision system the plurality of target devices carried on the loader to generate first target device training data representative of an image of the plurality of target devices obtained with the loader disposed in the first desired height; and storing, based on the operator input device receiving a first training confirmation signal from the operator of the associated tractor, the first target device training data in the non-transient memory device as a first of the set of loader height command data of the loader task data; with the loader disposed in a second desired height of the ordered sequence of loader heights to assume by the loader to perform the desired operation: imaging by the vision system the plurality of target devices carried on the loader to generate second target device training data representative of an image of the plurality of target devices obtained with the loader disposed in the second desired height; and storing, based on the operator input device receiving a second training confirmation signal from the operator of the associated tractor, the second target device training data in the non-transient memory device as a second of the set of loader height command data of the loader task data.

5. The positioning assist apparatus according to claim 1, wherein:

the non-transient memory device stores desired loader height data representative of the desired height of the loader;

the non-transient memory device stores automated operation logic; and the processor device is operable to execute the automated operation logic to:

determine, based on the desired loader height data and the current loader height data, a difference between the desired loader height and the determined current loader height; and generate, based on the determined difference between the desired loader height and the determined current loader height, a loader movement control signal representative of an incremental movement instruction required for effecting movement of the loader from the determined current loader height to the desired loader height, wherein the loader position control apparatus is operable to deliver the loader movement control signal to a controller of the associated tractor to control one or more cylinders of the loader to automatically move the loader from the determined current loader height to the desired loader height in response to the controller receiving the loader movement control signal.

6. The positioning assist apparatus according to claim 5, further comprising: loader task data stored in the non-transient memory device, the loader task data being representative of a desired operation to be performed by the loader and comprising a first set of loader height command data representative of an ordered sequence of loader heights to assume by the loader to perform the desired operation, wherein the processor device is operable to execute the automated operation logic to, in turn for each loader height command data of the first set of loader height command data: retrieve a further desired loader height data representative of a further desired loader height; determine, based on the vision system imaging the plurality of target devices, a further current loader height of the loader; generate, based on the determined further current loader height, further current loader height data representative of the determined further current loader height; determine, based on the further desired loader height data and the further current loader height data, a further difference between the further desired loader height and the determined further current loader height; and generate, based on the determined difference between the further desired loader height and the determined further current loader height, a further loader movement control signal representative of a further incremental movement instruction required for effecting movement of the loader from the determined further current loader height to the further desired loader height, wherein the loader position control apparatus is operable to deliver the further loader movement control signal to the controller of the associated tractor to control the one or more cylinders of the loader to automatically move the loader from the determined further current loader height to the further desired loader height in response to the controller receiving the further loader movement control signal.

7. The positioning assist apparatus according to claim 6, further comprising: training logic stored in the non-transient memory device; and an operator input device operatively coupled with the loader position control apparatus, the operator input device being operable to receive training confirmation signals, wherein, the processor device is operable to execute the training logic to generate the loader task data during a training session of the positioning assist apparatus by: with the loader disposed in a first desired height of the ordered sequence of loader heights to assume by the loader to perform the desired operation: imaging by the vision system the plurality of target devices carried on the loader to generate first target device training data representative of an image of the plurality of target devices obtained with the loader disposed in the first desired height; and storing, based on the operator input device receiving a first training confirmation signal from the operator of the associated tractor, the first target device training data in the non-transient memory device as a first of the set of loader height command data of the loader task data; with the loader disposed in a second desired height of the ordered sequence of loader heights to assume by the loader to perform the desired operation: imaging by the vision system the plurality of target devices carried on the loader to generate second target device training data representative of the image of the plurality of target devices obtained with the loader disposed in the second desired height; and storing, based on the operator input device receiving a second training confirmation signal from the operator of the associated tractor, the second target device training data in the non-transient memory device as a second of the set of loader height command data of the loader task data.

8. The positioning assist apparatus according to claim 1, wherein: the plurality of target devices comprises a set of one or more boom target devices carried on a boom of the loader, and a set of one or more tool carrier target devices carried on a tool carrier of the loader; the vision system is operable to image the set of one or more boom target devices to generate boom target device data representative of the image of the set of one or more boom target devices; the vision system is operable to image the set of one or more tool carrier target devices to generate tool carrier target device data representative of the image of the set of one or more tool carrier target devices; the processor device is operable to execute the loader positioning logic to: determine, based on the boom target device data, the height of the boom of the loader, and generate based on the determined height of the boom current boom height data representative of the determined height of the boom of the loader; and determine, based on the tool carrier target device data, the carrier angle of the tool carrier, and generate, based on the determined carrier angle of the tool carrier, current carrier angle data representative of the determined carrier angle of the tool carrier; and the display unit is operable to display on the screen, based on the generated current boom height and carrier angle data, a tool position image viewable by the operator of the associated tractor for assisting the operator move the tool carrier and boom of the loader to a desired position.

9. The positioning assist apparatus according to claim 8, further comprising:
   position determination logic stored in the non-transient memory device,
   wherein the processor device is operable to execute position determination logic to determine the height of the boom of the loader by:
      determining, based on the boom target device data generated by the vision system imaging the set of one or more boom target devices, a location of the set of one or more boom target devices in a coordinate reference framework;
      transforming the determined location of the set of one or more boom target devices in the coordinate reference framework into a location of the set of one or more boom target devices in a coordinate reference framework of the associated tractor and vision system operatively coupled with the associated tractor; and
      determining, based on the location of the set of one or more boom target devices in the coordinate reference framework of the associated tractor and vision system, a height of the loader relative to ground supporting the associated tractor as the determined height of the boom of the loader.

10. The positioning assist apparatus according to claim 9, wherein:
   the processor device is operable to execute position determination logic to determine the location of the set of one or more boom target devices in the coordinate reference framework by:
      determining a 6-dimensional (6-D) pose of the set of one or more boom target devices.

11. The positioning assist apparatus according to claim 1, wherein: the plurality of target devices comprises a set of one or more boom target devices carried on a boom of the loader; the vision system is operable to image the set of one or more boom target devices to generate boom target device data representative of the image of the set of one or more boom target devices; the processor device is operable to execute the loader positioning logic to determine a height of the boom of the loader by: determining a location of the set of one or more boom target devices in a coordinate reference framework, based on the boom target device data generated by the vision system imaging the set of one or more boom target devices by determining a 6-dimensional (6-D) pose of the set of one or more boom target devices; transforming the determined location of the set of one or more boom target devices in the coordinate reference framework into a location of the set of one or more boom target devices in a coordinate reference framework of the associated tractor and vision system operatively coupled with the associated tractor; and determining, based on the location of the set of one or more boom target devices in the coordinate reference framework of the associated tractor and vision system, a height of the loader relative to ground supporting the associated tractor as the determined height of the boom of the loader; and the display unit is operable to display on the screen, based on the generated current boom height data, a tool position image viewable by the operator of the associated tractor for assisting the operator move the boom of the loader to a desired position.

12. A method for assisting moving a loader carried on an associated tractor to a desired loader height, the method comprising: imaging by a vision system of a positioning assist apparatus and being disposed on the associated tractor a plurality of target devices carried on the loader; generating target device data by the vision system, the target device data being representative of an image of the plurality of target devices; storing loader positioning logic in a non-transient memory device of a loader position control apparatus of the positioning assist apparatus, the loader position control apparatus being operatively coupled with the vision system and comprising a processor device operatively coupled with the non-transient memory device; executing the loader positioning logic by the processor device to: determine, based on the target device data, a current loader height of the loader comprising a height of a boom of the loader and a carrier angle of a tool carrier of the loader; and generate, based on the determined current loader height, current loader height data representative of the determined current loader height, displaying based on the generated loader height data a current loader height image on a screen of a display unit operatively coupled with the loader position control apparatus, wherein the current loader height image displayed on the screen is viewable by an operator of the associated tractor, wherein the current loader height image visually communicates the determined current loader height to the operator for assisting moving the loader to the desired loader height.

13. The method according to claim 12, further comprising:
   storing assistive operation logic and desired loader height data in the non-transient memory device, the desired loader height data being representative of the desired loader height;
   executing the assistive operation logic by the processor device to:
      determine, based on the desired loader height data and the current loader height data, a difference between the desired loader height and the determined current loader height; and
      generate, based on the determined difference between the desired loader height and the determined current loader height, loader movement command data representative of an incremental movement instruction required for effecting movement of the loader from the determined current loader height to the desired loader height; and
   displaying on the screen of the display unit based on the generated loader movement command data a loader movement instruction image viewable by the operator of the associated tractor or visually communicating to the operator the determined difference between the desired loader height and the determined current loader height for assisting moving the loader to the desired loader height.

14. The method according to claim 13, further comprising:

storing loader task data in the non-transient memory device, the loader task data being representative of a desired operation to be performed by the loader and comprising a first set of loader height command data representative of an ordered sequence of loader heights to assume by the loader to perform the desired operation;

executing the assistive operation logic by the processor device to, in turn for each loader height command data of the first set of loader height command data:

retrieve a further desired loader height data representative of a further desired loader height;

determine, based on the vision system imaging the target device data, a further current loader height of the loader;

generate, based on the determined further current loader height, further current loader height data representative of the determined further current loader height;

determine, based on the further desired loader height data and the further current loader height data, a further difference between the further desired loader height and the determined further current loader height; and generate, based on the determined difference between the further desired loader height and the determined further current loader height, further loader movement command data representative of a further incremental movement instruction required for effecting movement of the loader from the determined further current loader height to the further desired loader height; and displaying on the screen of the display unit based on the generated further loader movement command data a further loader movement instruction image viewable by the operator of the associated tractor for visually communicating to the operator the determined difference between the further desired loader height and the determined further current loader height for assisting moving the loader to the further desired loader height.

15. The method according to claim 14, further comprising: storing training logic stored in the non-transient memory device; executing the training logic by the processor device to generate the loader task data during a training session of the positioning assist apparatus by: with the loader disposed in a first desired height of the ordered sequence of loader heights to assume by the loader to perform the desired operation: imaging by the vision system the plurality of target devices carried on the loader to generate first target device training data representative of the image of the plurality of target devices obtained with the loader disposed in the first desired height; and storing, based on receiving a first training confirmation signal from the operator of the associated tractor via an operator input device operatively coupled with the loader position control apparatus, the first target device training data in the non-transient memory device as a first of the set of loader height command data of the loader task data; with the loader disposed in a second desired height of the ordered sequence of loader heights to assume by the loader to perform the desired operation: imaging by the vision system the plurality of target devices carried on the loader to generate second target device training data representative of the image of the plurality of target devices obtained with the loader disposed in the second desired height; and storing, based on receiving a second training confirmation signal from the operator of the associated tractor via the operator input device operatively coupled with the loader position control apparatus, the second target device training data in the non-transient memory device as a second of the set of loader height command data of the loader task data.

16. The method according to claim 12, further comprising:

storing desired loader height data in the non-transient memory device, the desired loader height data being representative of the desired loader height;

storing automated operation logic in the non-transient memory device;

executing the automated operation logic by the processor device to:

determine, based on the desired loader height data and the current loader height data, a difference between the desired loader height and the determined current loader height; and generate, based on the determined difference between the desired loader height and the determined current loader position, a loader movement control signal representative of an incremental movement instruction required for effecting movement of the loader from the determined current loader height to the desired loader height; and delivering the loader movement control signal to a controller of the associated tractor to control one or more cylinders of the loader to automatically move the loader from the determined current loader height to the desired loader height in response to the controller receiving the loader movement control signal.

17. The method according to claim 16, further comprising:

storing loader task data in the non-transient memory device, the loader task data being representative of a desired operation to be performed by the loader and comprising a first set of loader height command data representative of an ordered sequence of loader heights to assume by the loader to perform the desired operation;

executing the automated operation logic by the processor device to, in turn for each loader height command data of the first set of loader height command data:

retrieve a further desired loader height data representative of a further desired loader height;

determine, based on the vision system imaging the target device data, a further current loader height of the loader;

generate, based on the determined further current loader height, further current loader height data representative of the determined further current loader height;

determine, based on the further desired loader height data and the further current loader height data, a further difference between the further desired loader height and the determined further current loader height; and generate, based on the determined difference between the further desired loader height and the determined further current loader height, a further loader movement control signal representative of a further incremental movement instruction required for effecting movement of the loader from the determined further current loader height to the further desired loader height; and delivering the further loader movement control signal to the controller of the associated tractor to control the one or more cylinders of the loader to automatically move the loader from the determined further current loader height to the further desired loader height in response to the controller receiving the further loader movement control signal.

18. The method according to claim 17, further comprising: storing training logic in the non-transient memory device; executing the training logic by the processor device to generate the loader task data during a training session of the positioning assist apparatus by: with the loader disposed in a first desired height of the ordered sequence of loader heights to assume by the loader to perform the desired operation: imaging by the vision system the plurality of target devices carried on the loader to generate first target device training data representative of the image of the plurality of target devices obtained with the loader disposed in the first desired height; and storing, based on receiving a first training confirmation signal from the operator of the associated tractor via an operator input device operatively coupled with the loader position control apparatus, the first target device training data in the non-transient memory device as a first of the set of loader height command data of the loader task data; with the loader disposed in a second desired height of the ordered sequence of loader heights to assume by the loader to perform the desired operation: imaging by the vision system the plurality of target devices carried on the loader to generate second target device training data representative of the image of the plurality of target devices obtained with the loader disposed in the second desired height; and storing, based on receiving a second training confirmation signal from the operator of the associated tractor via the operator input device operatively coupled with the loader position control apparatus, the second target device training data in the non-transient memory device as a second of the set of loader height command data of the loader task data.

19. The method according to claim 12, further comprising: storing position determination logic in the non-transient memory device; imaging by the vision system a set of one or more boom target devices carried on a boom of the loader to generate boom target device data representative of the image of the set of one or more boom target devices; imaging by the vision system a set of one or more tool carrier target devices carried on a tool carrier of the loader to generate tool carrier target device data representative of the image of the set of one or more tool carrier target devices; executing the position determination logic by the processor device to: determine, based on the boom target device data, the height of the boom of the loader, and generate based on the determined height of the boom current boom height data representative of the determined height of the boom of the loader; determine, based on the tool carrier target device data, the carrier angle of the tool carrier, and generate, based on the determined carrier angle of the tool carrier, current carrier angle data representative of the determined carrier angle of the tool carrier; determine, based on the boom target device data generated by the vision system imaging the set of one or more boom target devices, a location of the set of one or more boom target devices in a coordinate reference framework by determining a 6-dimensional (6-D) pose of the set of one or more boom target devices; transform the determined location of the set of one or more boom target devices in the coordinate reference framework into a location of the set of one or more boom target devices in a coordinate reference framework of the associated tractor and vision system operatively coupled with the associated tractor; determine, based on the location of the set of one or more boom target devices in the coordinate reference framework of the associated tractor and vision system, a height of the loader relative to ground supporting the associated tractor as the determined height of the boom of the loader; and displaying on the screen of the display unit based on the generated current boom height and carrier angle data, a tool position image viewable by the operator of the associated tractor for assisting the operator move the tool carrier and boom of the loader to a desired position.

20. The method according to claim 12, further comprising:

imaging by the vision system a set of one or more boom target devices carried on a boom of the loader to generate boom target device data representative of the image of the set of one or more boom target devices;

executing the loader positioning logic by the processor device to determine a height of the boom of the loader by:

determining a location of the set of one or more boom target devices in a coordinate reference framework, based on the boom target device data generated by the vision system imaging the set of one or more boom target devices by determining a 6-dimensional (6-D) pose of the set of one or more boom target devices;

transforming the determined location of the set of one or more boom target devices in the coordinate reference framework into a location of the set of one or more boom target devices in a coordinate reference framework of the associated tractor and vision system operatively coupled with the associated tractor; and determining, based on the location of the set of one or more boom target devices in the coordinate reference framework of the associated tractor and vision system, a height of the loader relative to ground supporting the associated tractor as the determined height of the boom of the loader; and displaying on the screen of the display unit based on the generated current boom height data, a tool position image viewable by the operator of the associated tractor for assisting the operator move a tool carrier and boom of the loader to a desired position.

* * * * *